United States Patent
Crisu et al.

(10) Patent No.: US 12,467,816 B2
(45) Date of Patent: Nov. 11, 2025

(54) DIAGNOSIS OF ELECTRICAL FAILURES IN CAPACITIVE SENSORS

(71) Applicant: Infineon Technologies AG, Neubiberg (DE)

(72) Inventors: Constantin Crisu, Bucharest (RO); Dan-Ioan-Dumitru Stoica, Buchare (RO); Cesare Buffa, Villach (AT); Alessandro Caspani, Villach (AT)

(73) Assignee: Infineon Technologies AG, Neubiberg (DE)

( * ) Notice: Subject to any disclaimer, the term of this patent is extended or adjusted under 35 U.S.C. 154(b) by 543 days.

(21) Appl. No.: 17/741,718

(22) Filed: May 11, 2022

(65) Prior Publication Data

US 2023/0366767 A1 Nov. 16, 2023

(51) Int. Cl.
| | |
|---|---|
| *G01L 25/00* | (2006.01) |
| *G01L 1/14* | (2006.01) |
| *G01R 31/52* | (2020.01) |
| *H03F 3/183* | (2006.01) |
| *H04R 19/04* | (2006.01) |

(52) U.S. Cl.
CPC ............. *G01L 25/00* (2013.01); *G01L 1/142* (2013.01); *G01R 31/52* (2020.01); *H03F 3/183* (2013.01); *H03F 2200/03* (2013.01); *H04R 19/04* (2013.01); *H04R 2201/003* (2013.01)

(58) Field of Classification Search
CPC ......... G01L 25/00; G01L 1/142; G01R 31/52; H03F 3/183; H03F 2200/03; H04R 19/04; H04R 2201/003
See application file for complete search history.

(56) References Cited

U.S. PATENT DOCUMENTS

| | | | | |
|---|---|---|---|---|
| 4,163,221 A | | 7/1979 | Kosakowski | |
| 6,501,282 B1 | * | 12/2002 | Dummermuth | ....... G01P 15/125 |
| | | | | 324/658 |
| 6,657,442 B1 | * | 12/2003 | Seppa | .................... G01R 19/22 |
| | | | | 324/661 |
| 9,942,677 B2 | | 4/2018 | Wiesbauer et al. | |
| 9,983,032 B1 | | 5/2018 | Kraver et al. | |

(Continued)

FOREIGN PATENT DOCUMENTS

| | | |
|---|---|---|
| DE | 102015217666 A1 | 3/2016 |
| DE | 102022100125 A1 | 8/2022 |

(Continued)

*Primary Examiner* — Catherine T. Rastovski
*Assistant Examiner* — Sharad Timilsina
(74) *Attorney, Agent, or Firm* — Harrity & Harrity, LLP

(57) ABSTRACT

A capacitive sensor includes a first conductive structure and a second conductive structure that form a first capacitor having a first capacitance that changes in response to an external force acting thereon and includes a MEMS output configured to output a first sense signal representative of the first capacitance; a second capacitor coupled to the MEMS output and configured to output a second sense signal based on the first sense signal; an amplifier comprising an amplifier input and configured to output an amplified signal based on the second sense signal; and a diagnostic circuit configured to receive two measurement signals, generate an offset measurement based on the two measurement signals, and detect a fault on a condition that the offset measurement is outside of a threshold range.

30 Claims, 10 Drawing Sheets

(56) References Cited

U.S. PATENT DOCUMENTS

| | | | |
|---|---|---|---|
| 11,733,060 B2 | 8/2023 | Stoica et al. | |
| 2004/0107775 A1 | 6/2004 | Kim | |
| 2010/0310096 A1* | 12/2010 | Josefsson | H04R 3/06 |
| | | | 381/113 |
| 2012/0056867 A1* | 3/2012 | Van Lier | G09G 3/3466 |
| | | | 345/212 |
| 2018/0167730 A1* | 6/2018 | Parker | H04R 19/005 |
| 2020/0373931 A1 | 11/2020 | Omran et al. | |
| 2022/0170958 A1 | 6/2022 | Enjalbert | |
| 2022/0252434 A1* | 8/2022 | Stoica | G01D 5/24466 |
| 2023/0064937 A1 | 3/2023 | Stoica et al. | |

FOREIGN PATENT DOCUMENTS

| | | | |
|---|---|---|---|
| EP | 1106981 | A2 | 6/2001 |
| JP | S54139453 | A | 10/1979 |

\* cited by examiner

DIAGNOSIS OF ELECTRICAL FAILURES IN CAPACITIVE SENSORS

BACKGROUND

Capacitive sensors have many applications and may be used as pressure sensors, acoustic sensors, microphone sensors, and the like. A capacitive sensor may be a microelectromechanical system (MEMS) capacitive sensor in any of the aforementioned applications.

Leakage is a known failure mode in capacitive sensors. It may occur as inherent leakage of the device itself, drifts of which can be expected during lifetime operation, or, more critically, it may occur as a result of conductive particle contamination.

For example, a known failure mode is a conductive particle between the conductive membrane and a conductive back-plate that are typically electrically isolated from each other. The conductive particle may cause a short between the conductive membrane and the conductive back-plate, thus causing leakage current and faulty sensing. The result is a leakage current and/or a degradation of sensitivity. The leakage current may also increase noise in the sensor.

Therefore, an improved device capable of detecting and diagnosis electrical failures in capacitive sensors due to the presence of a leakage current may be desirable.

SUMMARY

Embodiments provide a capacitive sensor including a first conductive structure; a second conductive structure that is counter to the first conductive structure, wherein at the second conductive structure is movable relative to the first conductive structure in response to an external force acting thereon, wherein the second conductive structure is capacitively coupled to the first conductive structure to form a first capacitor having a first capacitance that changes with a change in a distance between the first conductive structure and second conductive structure, wherein the first capacitance is representative of the external force and the first capacitor comprises a first MEMS output configured to output a first sense signal representative of the first capacitance; a second capacitor comprising a first terminal and a second terminal, the first terminal being coupled to the first MEMS output of the first capacitor in order to receive the first sense signal and the second terminal being configured to output a second sense signal based on the first sense signal; an amplifier comprising a first amplifier input coupled to the second terminal of the second capacitor and configured to output a first amplified signal based on the second sense signal; and a diagnostic circuit configured to receive one of the first sense signal, the second sense signal, or the first amplified signal as a first measurement signal, receive a different one of the first sense signal, the second sense signal, or the first amplified signal as a second measurement signal, generate an first offset measurement based on the first measurement signal and the second measurement signal, wherein the first offset measurement is representative of a degree of pattern similarity between the first measurement signal and the second measurement signal, compare the first offset measurement to a first threshold range defined by a first threshold and a second threshold, and detect a first fault on a condition that the first offset measurement is outside of the first threshold range.

Embodiments provide a capacitive sensor including a first conductive structure; a second conductive structure that is counter to the first conductive structure, wherein at the second conductive structure is movable relative to the first conductive structure in response to an external force acting thereon, wherein the second conductive structure is capacitively coupled to the first conductive structure to form a first capacitor having a first capacitance that changes with a change in a distance between the first conductive structure and second conductive structure, wherein the first capacitance is representative of the external force and the first capacitor comprises a first MEMS output configured to output a first sense signal representative of the first capacitance; a second capacitor comprising a first terminal and a second terminal, the first terminal being coupled to the first MEMS output of the first capacitor in order to receive the first sense signal and the second terminal being configured to output a second sense signal based on the first sense signal; an amplifier comprising a first amplifier input coupled to the second terminal of the second capacitor and configured to output a first amplified signal and a second amplified signal based on the second sense signal, wherein the first amplified signal is in phase with the second sense signal and the second amplified signal is 180° out of phase with the second sense signal; and a diagnostic circuit configured to receive a first pair of signals including the first amplified signal and the second amplified signal, generate a first offset measurement based on the first pair of signals, wherein the first offset measurement is representative of a degree of pattern similarity between the first amplified signal and the second amplified signal, compare the first offset measurement to a first threshold range defined by a first threshold and a second threshold, and detect a first fault on a condition that the first offset measurement is outside of the first threshold range.

Embodiments provide a capacitive sensor including a first conductive structure; a second conductive structure that is counter to the first conductive structure, wherein at the second conductive structure is movable relative to the first conductive structure in response to an external force acting thereon, wherein the second conductive structure is capacitively coupled to the first conductive structure to form a first capacitor having a first capacitance that changes with a change in a distance between the first conductive structure and second conductive structure, wherein the first capacitance is representative of the external force and the first capacitor comprises a first MEMS output configured to output a first sense signal representative of the first capacitance; an amplifier comprising a first amplifier input coupled to the first MEMS output for receiving the first sense signal and configured to output a first amplified signal and a second amplified signal based on the first sense signal, wherein the first amplified signal is in phase with the first sense signal and the second amplified signal is 180° out of phase with the first sense signal; and a diagnostic circuit configured to: receive a first pair of signals including the first sense signal and the first amplified signal, generate a first offset measurement based on the first pair of signals, wherein the first offset measurement is representative of a degree of pattern similarity between the first sense signal and the first amplified signal, compare the first offset measurement to a first threshold range defined by a first threshold and a second threshold, and detect a first fault on a condition that the first offset measurement is outside of the first threshold range, or receive a second pair of signals including the first sense signal and the second amplified signal, generate a second offset measurement based on the second pair of signals, wherein the second offset measurement is representative of a degree of pattern similarity between the first sense signal and the second amplified signal, compare the second offset measurement to a second threshold range defined by a third threshold and a fourth threshold, and detect a second fault on a condition that the second offset measurement is outside of the second threshold range.

Embodiments provide a capacitive sensor including a first conductive structure; a second conductive structure that is counter to the first conductive structure, wherein at the second conductive structure is movable relative to the first conductive structure in response to an external force acting thereon, wherein the second conductive structure is capacitively coupled to the first conductive structure to form a first capacitor having a first capacitance that changes with a change in a distance between the first conductive structure and second conductive structure, wherein the first capacitance is representative of the external force and the first capacitor comprises a first MEMS output configured to output a first sense signal representative of the first capacitance; a third conductive structure that is counter to the first conductive structure, wherein the third conductive structure is movable relative to the first conductive structure, wherein the third conductive structure is capacitively coupled to the first conductive structure to form a second capacitor having a second capacitance that changes with a change in a distance between the first conductive structure and third conductive structure, wherein the second capacitance is representative of the external force and the second capacitor comprises a second MEMS output configured to output a second sense signal representative of the second capacitance; an amplifier comprising a first amplifier input coupled to the first MEMS output for receiving the first sense signal and configured to output a first amplified signal based on the first sense signal and comprising a second amplifier input coupled to the second MEMS output and configured to output a second amplified signal based on the second sense signal; and a diagnostic circuit configured to receive a first pair of signals including the first sense signal and the first amplified signal, generate a first offset measurement based on the first pair of signals, wherein the first offset measurement is representative of a degree of pattern similarity between the first sense signal and the first amplified signal, compare the first offset measurement to a first threshold range defined by a first threshold and a second threshold, and detect a first fault on a condition that the first offset measurement is outside of the first threshold range

BRIEF DESCRIPTION OF THE DRAWINGS

Embodiments are described herein making reference to the appended drawings.

DETAILED DESCRIPTION

Figure 1:
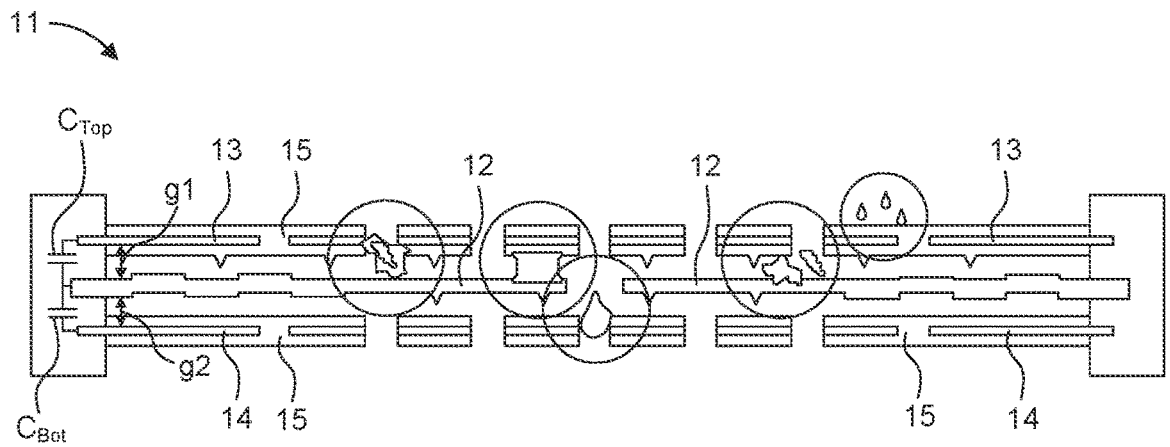
FIG. 1 shows a cross-section view of a MEMS element of a capacitive sensor according to one or more embodiments.

In the following, details are set forth to provide a more thorough explanation of the exemplary embodiments. However, it will be apparent to those skilled in the art that embodiments may be practiced without these specific details. In other instances, well-known structures and devices are shown in block diagram form or in a schematic view rather than in detail in order to avoid obscuring the embodiments. In addition, features of the different embodiments described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments unless noted to the contrary.

The term "substantially" may be used herein to account for small manufacturing tolerances (e.g., within 5%) that are deemed acceptable in the industry without departing from the aspects of the embodiments described herein.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

One or more aspects of the present disclosure may be implemented as a non-transitory computer-readable recording medium having recorded thereon a program embodying methods/algorithms for instructing the processor to perform the methods/algorithms. Thus, a non-transitory computer-readable recording medium may have electronically readable control signals stored thereon, which cooperate (or are capable of cooperating) with a programmable computer system such that the respective methods/algorithms are performed. The non-transitory computer-readable recording medium can be, for example, a CD-ROM, DVD, Blu-ray disc, a RAM, a ROM, a PROM, an EPROM, an EEPROM, a FLASH memory, or an electronic memory device.

Each of the elements of the present disclosure may be configured by implementing dedicated hardware or a software program on a memory controlling a processor to perform the functions of any of the components or combinations thereof. Any of the components may be implemented as a central processing unit (CPU) or other processor reading and executing a software program from a recording medium such as a hard disk or a semiconductor memory device. For example, instructions may be executed by one or more processors, such as one or more CPUs, digital signal processors (DSPs), general-purpose microprocessors, application-specific integrated circuits (ASICs), field programmable logic arrays (FPGAs), programmable logic controller (PLC), or other equivalent integrated or discrete logic circuitry.

Accordingly, the term "processor," as used herein refers to any of the foregoing structures or any other structure suitable for implementation of the techniques described herein. Thus, the techniques described in this disclosure may be implemented, at least in part, in hardware, software, firmware, or any combination thereof. For example, various aspects of the described techniques may be implemented within one or more processors, including one or more microprocessors, DSPs, ASICs, or any other equivalent integrated or discrete logic circuitry, as well as any combinations of such components.

A controller including hardware may also perform one or more of the techniques of this disclosure. A controller, including one or more processors, may use electrical signals and digital algorithms to perform its receptive, analytic, and control functions, which may further include corrective functions. Such hardware, software, and firmware may be implemented within the same device or within separate devices to support the various techniques described in this disclosure. Software may be stored on a non-transitory computer-readable medium such that the non-transitory computer readable medium includes a program code or a program algorithm stored thereon which, when executed, causes the controller, via a computer program, to perform the steps of a method.

A signal processing circuit and/or a signal conditioning circuit may receive one or more signals from one or more components and perform signal conditioning or processing thereon. Signal conditioning, as used herein, refers to manipulating a signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a signal suitable for processing after conditioning.

Thus, a signal processing circuit may include an analog-to-digital converter (ADC) that converts the analog signal from the one or more sensor elements to a digital signal. The signal processing circuit may also include a digital signal processor (DSP) that performs some processing on the digital signal.

Embodiments are directed to the diagnosis of electrical failures in capacitive sensors, and more precisely the diagnosis of leakage currents in micro-electromechanical system (MEMS) capacitive sensors, one of the critical failure modes of this device. The diagnosis may be applied any capacitive sensor, including single capacitive sensors or those that use two capacitors (e.g., a top capacitor $C_{Top}$ and a bottom capacitor $C_{Bot}$) for sensing and generating measurements signals representative of the physical quantity (e.g., pressure, acoustic waves, vibrations, or any other alternating current (AC) external force) being measured by the capacitive sensor.

The diagnostic circuit performs its diagnosis by measuring some selected electrical parameter of the MEMS capacitive sensor, such as direct current (DC) voltages extracted from two different nodes within the circuit, and then supplies this information as an output diagnosis after some pre-processing. Depending on the read-out solution used (e.g., constant charge), a leakage current or some other fault, if present, will result in a DC voltage shift at the output of the MEMS capacitive sensor, at an input of a sense amplifier, or at an output of a sense amplifier that deviates unexpectedly from another comparable node within the circuit. The diagnostic circuit is configured to detect the deviation between two sense signals (e.g., between two DC voltages) and signal a fault when the deviation is detected.

FIG. 1 shows cross-section views of a MEMS element of a capacitive sensor according to one or more embodiments. In particular, FIG. 1 shows a MEMS element 11 of a dual backplate capacitive sensor that may be implemented as a MEMS microphone, but the embodiments are not limited thereto. For example, MEMS capacitive sensors may also be used as pressure sensors.

The MEMS element 11 of the dual backplate capacitive sensor includes three electrodes, including one conductive membrane 12 and two conductive back-plates 13 and 14. The membrane 12 is movable and the two conductive back-plates 13 and 14 may be movably fixed in a stationary position. In other embodiments, one or more of the back-plates 13 and 14 may also be movable.

A top capacitor CTop is formed between the top back-plate 13 and the membrane 12 and a bottom capacitor CBot is formed between the bottom back-plate 14 and the membrane 12. As the distance (i.e., thickness of gap g1 or g2) between respective electrodes changes in response to an external force (e.g., pressure or acoustic waves (sound)) applied to the movable conductive structure (e.g., the membrane 12), the capacitance of each capacitor CTop and CBot changes. For example, capacitance is calculated according to the formula Q=CV, where Q is the charge in coulombs, C is the capacitance in farads, and V is the potential difference between the electrodes of the capacitor in volts.

A read-out circuit may be used to measure the change in capacitance. For example, a read-out circuit may utilize constant change readout during which the voltage V is measured while the charge Q is held constant. The change in capacitance caused by the thickness of gaps g1 and g2 changing causes the voltages Vtop and Vbot stored across the capacitors to change, and a measurement circuit may measure these voltages as sensor signals. Specifically, the voltage across each capacitor CTop and CBot represents a sensor signal that can be measured by a readout circuit and correlated into a physical quantity such as pressure or acoustic waves (sound). Thus, the voltage is the variable to be measured.

In the present example, the membrane 12 may move closer to one back-plate as it moves further from the other back-plate, thereby changing the capacitance of each capacitor CTop and CBot. As a result, the voltages Vtop and Vbot change inversely or 180° out of phase to each other due to the movement of the conductive membrane 12 moving closer to one of the back-plates 13 or 14 as it moves further from the other one of the back-plates 13 or 14. The movement of the membrane 12 is cause by an external force (e.g., pressure or acoustic waves (sound), or vibration) applied to the membrane 12. These external forces are oscillating or AC external forces that that changes in polarity or direction over time.

It will also be appreciated that the embodiments are not limited to dual backplate capacitive sensors but may also apply to single capacitor sensors consisting of two electrodes or capacitive sensors with two or more capacitors, including dual capacitive sensors where the two outside electrodes are movable and the middle electrode is movably fixed. For example, the MEMS element 11 may be a single backplate capacitive sensor that includes only one of the conductive back-plates 13 or 14 to form a single capacitor. Regardless of the type of capacitive sensor, at least two electrodes are used to form at least one capacitor. Each capacitor is thereby formed by two electrodes, at least one of which is moveable relative to the other in response to an external force being applied thereto. One electrode of a capacitor may be referred to as a reference electrode, whereas the other electrode of a capacitor may be referred to as a counter electrode.

An isolation material 15 is also provided to provide electrical isolation between the conductive elements 12, 13, and 14.

Conductive materials such as metal particles or water droplets may penetrate the MEMS element 11 and form a conductive path (e.g., a short) between otherwise electrically isolated portions of the MEMS element 11. An unwanted leakage current may form as a result that negatively impacts the performance of the MEMS element 11. Leakage current may also be caused by internal defects within the integrated circuit itself that may develop over the lifetime of the device. The following embodiments provide additional readout circuitry used to detect a leakage current and possibly compensate for the leakage current to restore or otherwise improve the functionality of the capacitive sensor.

Figure 2:
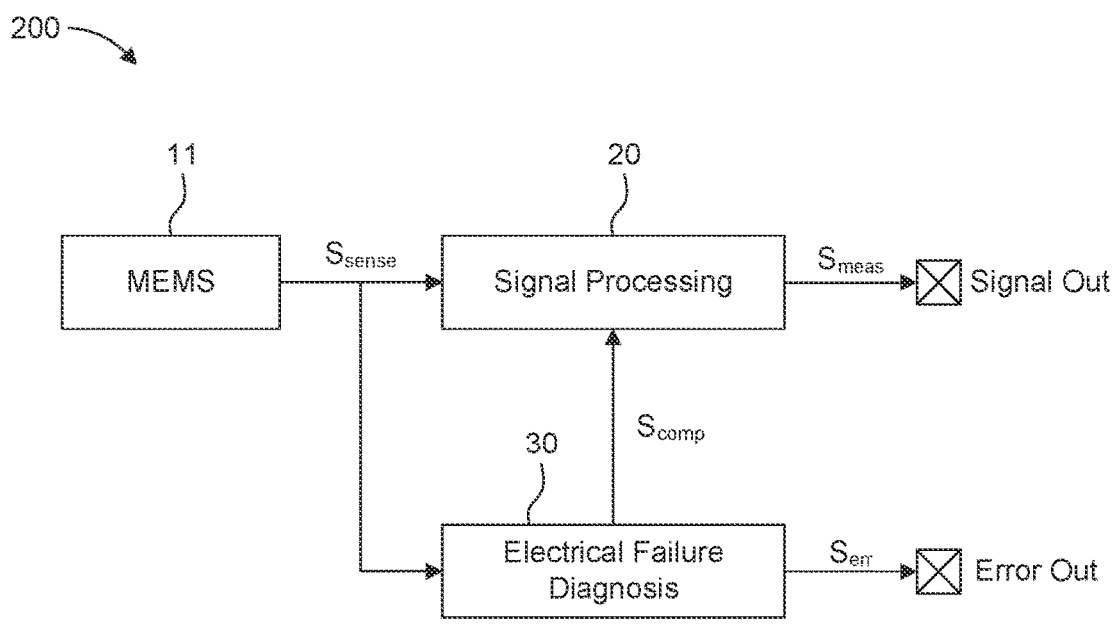
FIG. 2 is a block diagram of a capacitive sensor according to one or more embodiments.

FIG. 2 is a block diagram of a capacitive sensor 200 according to one or more embodiments. The capacitive sensor 200 includes a MEMS element (e.g., MEMS element 1 or 11) and a signal processing circuit 20 that is configured to receive sensor signals Ssense (e.g., voltages Vtop and Vbot) from the MEMS element 11, perform signal processing thereon, and output the processed sensor signals as measurement signals Smeas at Signal Out. A readout circuit is provided between the MEMS element 11 and the signal processing circuit 20. The readout circuit receives signals from the MEMS element 11 and may include a biasing circuit (e.g., a resistive biasing circuit) for providing signals to the signal processing circuit 20. The capacitive sensor 200 also includes an electrical failure diagnosis circuit 30 that is configured to receive the sensor signals Ssense and/or the measurement signals Smeas and detect a leakage current or other fault based thereon. In response to detecting an electrical failure, such as a leakage current, the electrical failure diagnosis circuit 30 is configured to generate an error signal Serr and output the error signal Serr at Error Out.

In order to detect an electrical failure, the electrical failure diagnosis circuit 30 is configured to measure one of the electrical parameters affected by MEMS leakage current, compare the electrical parameter to a predetermined error threshold, and generate the error signal Serr in response to the electrical parameter crossing (e.g., exceeding) the predetermined error threshold. An electrical parameter affected by the MEMS leakage current may include a DC voltage. In particular, a leakage current, if present, may result in a DC voltage shift at the output of the MEMS element 11, at the input of a sense amplifier, or at an output of the sense amplifier. The electrical failure diagnosis circuit 30 may be configured to monitor for and detect the DC voltage shift that exceeds a predetermined error threshold at one or more of these circuit nodes.

The error signal Serr may be provided to a further diagnostic circuit (not illustrated) configured to perform further analysis on the capacitive sensor 200 to determine the cause or the source of the electrical failure. The electrical failure diagnosis circuit 30 may also be configured to compensate for the detected leakage current by regulating the affected electrical parameter and restore reasonable performance. The electrical failure diagnosis circuit 30 is configured to generate and transmit a compensation signal Scomp to the signal processing circuit 20 or to a readout circuit where the compensation information provided in the compensation signal Scomp is used to compensate for the affected electrical parameter.

Figure 3A:
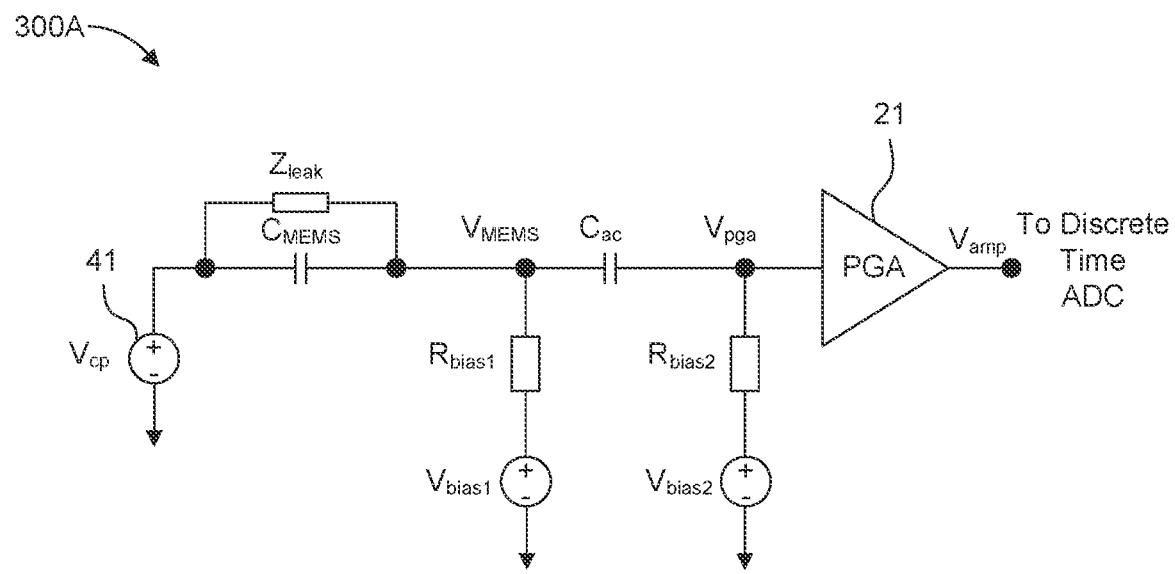
FIGS. 3A and 3B are schematic block diagrams of capacitive sensor read-out circuits according to one or more embodiments.
Figure 3B:
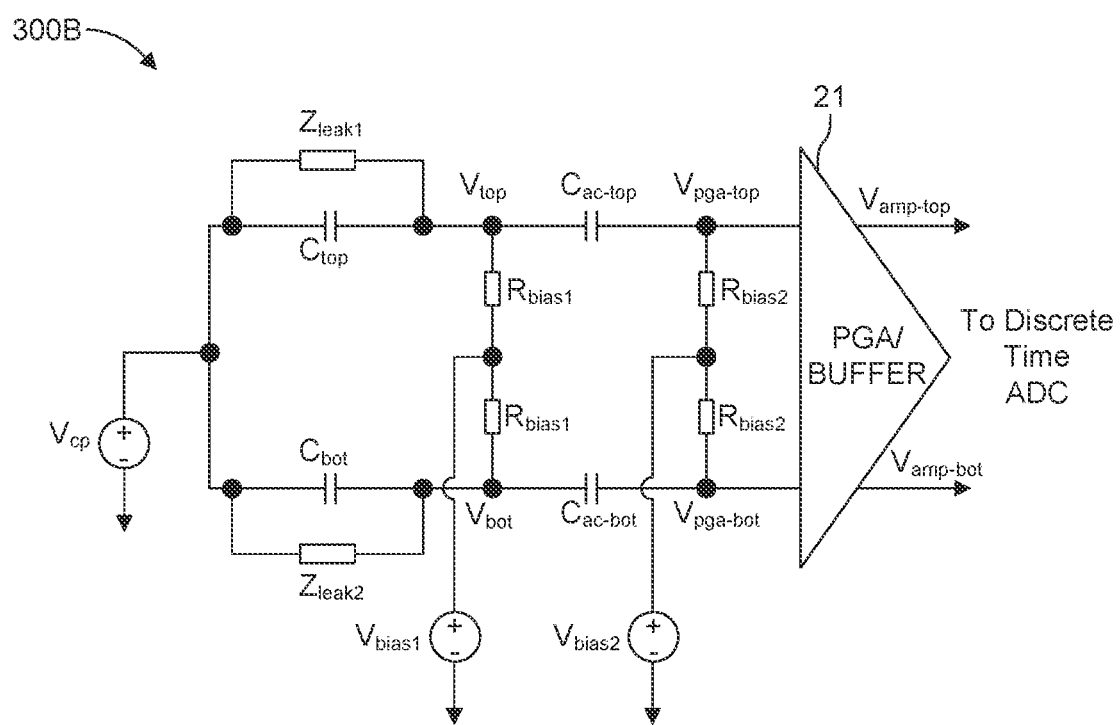

FIGS. 3A and 3B are schematic block diagrams of capacitive sensor read-out circuits according to one or more embodiments. In particular, FIG. 3A illustrates a single ended MEMS capacitive sensor 300A that includes only one conductive back-plate to form a single capacitor CMEMS and FIG. 3B illustrates a differential MEMS capacitive sensor 300B that includes two conductive back-plates to form two capacitors CTop and CBot. Both capacitive sensors 300A and 300b include constant charge (CC) read-out circuits for reading out signals of a capacitive MEMS element (e.g., MEMS element 11). Thus, the charge of each capacitor CMEMS, CTop, and CBot is held constant while the voltage across the capacitors is varied based on the change in capacitance.

A DC bias voltage supply Vcp that supplies a DC bias voltage (common potential) to the conductive structures (i.e., the back-plate(s) and membrane(s)) of the MEMS element. AC external forces are applied and act on the conductive structures, thereby causing a change in capacitance at capacitors CMEMS, CTop and/or CBot.

An amplifier 21, such as a programmable-gain amplifier (single or differential) or a buffer amplifier, is configured to receive the voltages Vtop and Vbot from the MEMS element as sensor signals. The amplifier 21 is part of the signal processing circuit 20 and may be the beginning of a signal processing chain thereof. For example, the amplifier 21 may be configured to receive the sensor signals (i.e., voltages VMEMS, Vtop and/or Vbot) and provide amplified sensor signals to a discrete time ADC (not illustrated) that is arranged downstream along the signal processing chain of the signal processing circuit 20.

A leakage current can be modelled as a leakage component Zleak (e.g., a leakage resistor or a leakage current source) that is coupled in parallel to the MEMS equivalent capacitance, CMEMS, CTop, or CBot, respectively. There may be a leakage between the top two conductive structures of the MEMS element 11 (e.g., conductive structures 12 and 13) or between the bottom two conductive structures of the MEMS element 11 (e.g., conductive structures 12 and 14). Thus, there may be a leakage component Zleak modelled for each leakage current as indicated by leakage components Zleak, Zleak1, and Zleak2.

Turning to FIG. 3A, the output voltage VMEMS of the MEMS capacitor CMEMS is set via a high-ohmic bias resistor Rbias1 and a bias voltage Vbias1. The output voltage VMEMS is transferred to an input node of the sense amplifier 21 through an AC capacitor Cac. The AC capacitor Cac includes a first terminal and a second terminal, the first terminal being coupled to the output of the MEMS capacitor CMEMS in order to receive the output voltage VMEMS as a first sense signal and the second terminal being configured to output an amplifier input voltage Vpga as a second sense signal based on the first sense signal. The input node of the sense amplifier at Vpga is set via a high-ohmic bias resistor Rbias2 and a bias voltage Vbias2. It will be appreciated that the AC capacitor Cac and the input node at Vpga may be integrated within the sense amplifier or may be implemented external thereto.

The bias resistors Rbias1 and Rbias2 are set at a very high-ohmic value to reduce noise present at the output of the MEMS element 11 and the input of the amplifier 21. For example, the bias resistors Rbias1 and Rbias2 may be initially set anywhere between 1 Gohm and 500 Gohms depending on the noise suppression requirements and bandwidth requirements of the readout circuit. The higher the resistance, the higher the noise suppression that provides higher SNR. However, it is conceivable that other resistances could be used. In this example, bias resistors Rbias1 and Rbias2 are maintained to be equal or substantially equal and may be adjustable in order to compensate for a detected leakage current or other fault.

The first sense signal (VMEMS) comprises a first AC component and a first DC component and the second sense signal (Vpga) comprises a second AC component and a second DC component. The first AC component and the second AC component are in phase with each other (e.g., maintained by the AC capacitor Cac). This in-phase relationship allows the two voltages or sense signals to be compared with each other, and specially allows the DC components of the two voltages or sense signals to be compared with each other.

Output voltage VMEMS and amplifier input voltage Vpga should have similar DC and AC values when the capacitive sensor 300A is operating normally. If both DC and AC components are the same, then no fault is detected. On the other hand, if AC components remains the same for VMEMS and Vpga and one of the DC values changes, then an DC offset or DC voltage difference between the two sense signals can be detected for detecting a fault. A DC shift in VMEMS may signal a fault at the MEMS element 11, such as a leakage current, and a DC shift in Vpga may signal a fault at the sense amplifier. This principle may allow a diagnostic circuit to discriminate the origin of any detected fault for further assessment and/or compensation.

The sense amplifier 21 includes a first amplifier input at Vpga coupled to the second terminal of the AC capacitor Cac and is configured to output an amplified signal Vamp based on the amplifier input voltage Vpga. The sense amplifier 21 may apply a predetermined gain to the amplifier input voltage Vpga to generate the amplified signal Vamp. Additionally, the output of the sense amplifier may be an inverting or non-inverting output such that the amplified signal Vamp is either 180° out-of-phase or in-phase, respectively, with respect to the amplifier input voltage Vpga.

Turning to FIG. 3B, the differential MEMS capacitive sensor 300B includes similar components as described for the single ended MEMS capacitive sensor 300A, but in duplicate for each MEMS capacitor CTop and CBot. A leak current is modelled for each MEMS capacitor CTop and CBot by leakage components Zleak1 and Zleak2, respectively. Output voltages VTop and VBot correspond to output voltage VMEMS for their respective MEMS capacitor CTop and CBot. Each readout channel includes a respective AC capacitor, Cac_top and Cac_bot, that is connected in a respective input of the sense simplifier at which a respective amplifier input voltage Vpga_top or Vpga_bot is generated as similarly described above.

The outputs of the MEMS capacitors CTop and CBot are biased by a biasing circuit that includes two bias resistors Rbias1 and a bias voltage Vbias1 coupled to a common node, which is used to reduce noise present at the MEMS outputs. The inputs of the sense amplifier 21 are biased by a biasing circuit that includes two bias resistors Rbias2 and a bias voltage Vbias2 coupled to a common node, which is used to reduce noise present at the amplifier inputs.

Output voltage VTop and amplifier input voltage Vpga_top should have similar DC and AC values when the capacitive sensor 300B is operating normally. If both DC and AC components are the same, then no fault is detected. On the other hand, if AC components remains the same for VTop and Vpga_top and one of the DC values changes, then an DC offset or DC voltage difference between the two sense signals can be detected for detecting a fault. A DC shift in VTop may signal a fault at Ctop, such as a leakage current, and a DC shift in Vpga_top may signal a fault at the sense amplifier 21. This principle may allow a diagnostic circuit to discriminate the origin of any detected fault for further assessment and/or compensation.

Likewise, output voltage VBot and amplifier input voltage Vpga_bot should have similar DC and AC values when the capacitive sensor 300B is operating normally. If both DC and AC components are the same, then no fault is detected. On the other hand, if AC components remains the same for VBot and Vpga_bot and one of the DC values changes, then an DC offset or DC voltage difference between the two sense signals can be detected for detecting a fault. A DC shift in VBot may signal a fault at Cbot, such as a leakage current, and a DC shift in Vpga_bot may signal a fault at the sense amplifier 21. This principle may allow a diagnostic circuit to discriminate the origin of any detected fault for further assessment and/or compensation.

It is also to be noted that output voltages VTop and VBot should be 180° of phase with respect to each other. As a result, amplifier input voltages Vpga_top and Vpga_bot should also be 180° of phase with respect to each other.

The sense amplifier 21 may be a differential programmable-gain amplifier or a differential buffer amplifier, is configured to receive the amplifier input voltages Vpga_top and Vpga_bot as sensor signals and output a differential signal representative of the difference between voltages Vtop and Vbot. The differential amplifier 21 is part of the signal processing circuit 20 and may be the beginning of a signal processing chain thereof. For example, the differential amplifier 21 may be configured to receive the sensor signals (i.e., voltages Vpga_top and Vpga_bot) and provide amplified sensor signals to a discrete time ADC that is arranged downstream along the signal processing chain of the signal processing circuit 20.

In particular, the sense amplifier 21 includes a first amplifier input at Vpga_top coupled to the second terminal of the AC capacitor Cac_top and is configured to output a first amplified signal Vamp_top based on the amplifier input voltage Vpga_top. The sense amplifier 21 may apply a predetermined gain to the amplifier input voltage Vpga_top to generate the first amplified signal Vamp_top. Additionally, the first output of the sense amplifier may be an inverting or non-inverting output such that the first amplified signal Vamp_top is either 180° out-of-phase or in-phase, respectively, with respect to the first amplifier input voltage Vpga_top. The sense amplifier 21 also includes a second amplifier input at Vpga_bot coupled to the second terminal of the AC capacitor Cac_bot and is configured to output a second amplified signal Vamp_bot based on the amplifier input voltage Vpga_bot. The sense amplifier 21 may apply a predetermined gain to the amplifier input voltage Vpga_bot to generate the second amplified signal Vamp_bot. Additionally, the second output of the sense amplifier may be an inverting or non-inverting output such that the second amplified signal Vamp_bot is either 180° out-of-phase or in-phase, respectively, with respect to the second amplifier input voltage Vpga_bot.

As will be described in further detail below, the capacitive sensors 300A and 300B each include a diagnostic circuit that includes one or more evaluation circuits. Each evaluation circuit evaluates an offset measurement (e.g., a DC offset) of a different pair of measurement signals by comparing the DC offset to a predetermined threshold range. The offset measurement is representative of a degree of pattern similarity between a first measurement signal and a second measurement signal. The measurement signals may be selected from any combination of the signals present at the MEMS outputs, the sense amplifier inputs, or the sense amplifier outputs. The pattern similarity of two in-phase signals may be that the DC components follow same sinusoid according to their corresponding AC components. Thus, the DC components should be substantially equal at any given time as the signals oscillate. The pattern similarity of two out-of-phase signals may be that the average of one DC component is substantially the same as the average of one DC component over time. Thus, the extrema of the two signals should remain substantially the same over time as the signals oscillate.

For example, if two in-phase signals are compared, then the DC components of those two signals should remain in-step with each other as the two AC components oscillate. In other words, the two signals should be substantially equal. In this case, the offset measurement may represent a difference between the two measurement signals. If a DC shift is present at one of the measurement signals, the difference is driven up or down and potentially outside of the predetermined threshold range.

On the other hand, if two out-of-phase signals are compared, then the DC components of those two signals should be offset from each other based on the phase offset. In this case, either one or more phase shifters can be used to align the phases of the two signals so that the two signals are expected to be substantially equal. Again, the offset measurement may represent a difference between the two measurement signals when the phases of the two signals are brought into alignment. If a DC shift is present at one of the measurement signals, the difference is driven up or down and potentially outside of the predetermined threshold range.

Alternatively, an averaging circuit may be used to generate the offset measurement of the two out-of-phase signals, where the offset measurement represents an average of the two signals. If a DC shift is present at one of the measurement signals, the average is driven up or down and potentially outside of the predetermined threshold range.

Each evaluation circuit is configured to compare an offset measurement to a respective threshold range defined by a respective first threshold and a respective second threshold, and detect a fault on a condition that the offset measurement is determined to be outside of the respective threshold range. If the offset measurement is determined to be within the predetermined threshold range, no fault is detected. However, if the offset measurement is determined to be outside the predetermined threshold range, then a fault may be detected. In some instances, a fault is detected when the offset measurement is determined to be outside the predetermined threshold range. In other instances, the fault is passed through an error processing circuit that verifies the presence of a fault.

Figure 4A:
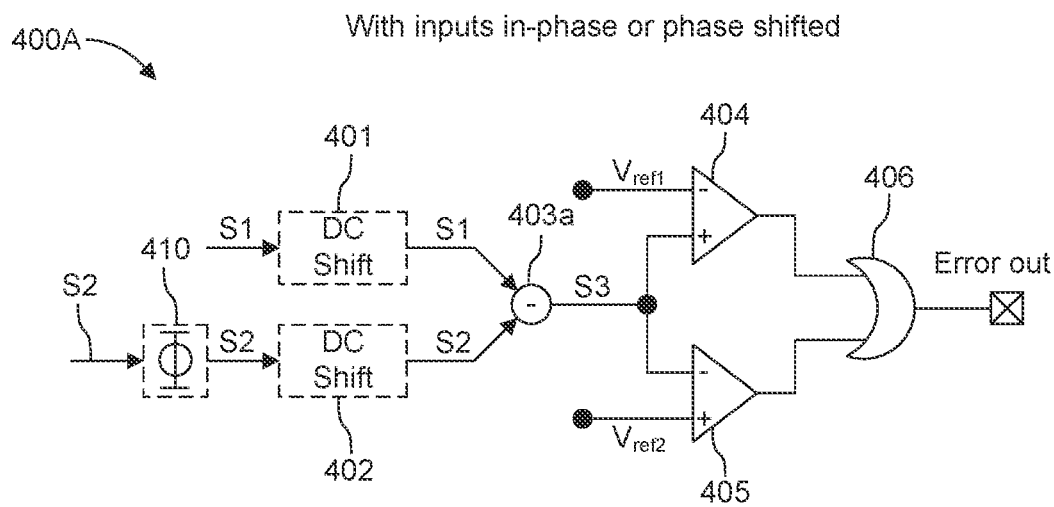
FIG. 4A is a schematic block diagram of a first type of evaluation circuit of a diagnostic circuit according to one or more embodiments.

FIG. 4A is a schematic block diagram of a first type of evaluation circuit 400A of a diagnostic circuit according to one or more embodiments. The evaluation circuit 400A is configured to evaluate two in-phase measurement signals S1 and S2.

The evaluation circuit 400A may include two optional DC shift circuits 401 and 402. The DC shift circuits 401 and 402 are used to shift mainly the DC component of their measured signal to a mid-centered output value (e.g., a mid-supply value). This way, the evaluation circuit can output a trustful error output maximizing the AC superimposed at the input of the block. In other words, the DC shift circuits 401 and 402 help to minimize the measurement signals from being clipped. The DC shift blocks can have a simple structure, like source followers, implementing a DC shift from their input to their output.

The measurement signals S1 and S2 are provided to a different circuit 403 (e.g., a subtractor) which generates a measurement offset signal S3 as the difference of the two measurement signals S1 and S2. Ideally, the value of the measurement offset signal S3 should be 0 V or substantially 0 V since the two measurement signals S1 and S2 should be equal or substantially equal under normal conditions. A window comparator circuit comprising two comparators 404 and 405 in parallel to determine if the measurement offset signal S3 is between two reference voltages Vref1 and Vref2. Reference voltage Vref1 may be a positive volage (e.g., 0.5 V, 1 V, etc.) and reference voltage Vref2 may be a negative volage (e.g., −0.5 V, −1 V, etc.). The two reference voltages Vref1 and Vref2 should be symmetric about a 0 V midpoint. Using a window comparator allows a small difference between AC and DC components of S1 and S2 to be tolerated by the circuit if the thresholds of the comparators are chosen accordingly. If the measurement offset signal S3 is within the window (i.e., within the predetermined threshold range), the output of an OR gate 406 is low, signaling no fault at error_out. If the measurement offset signal S3 is outside of the window (i.e., is greater than Vref1 or less than Vref2 and thus outside the predetermined threshold range), the output of the OR gate 406 is high, signaling a fault or a potential fault at error_out.

It will become apparent from FIGS. 5-8 that any two pairs of in-phase measurements signals can be input to the evaluation circuit 400A and that measurements signals S1 and S2 are merely used as an example.

Figure 4B:
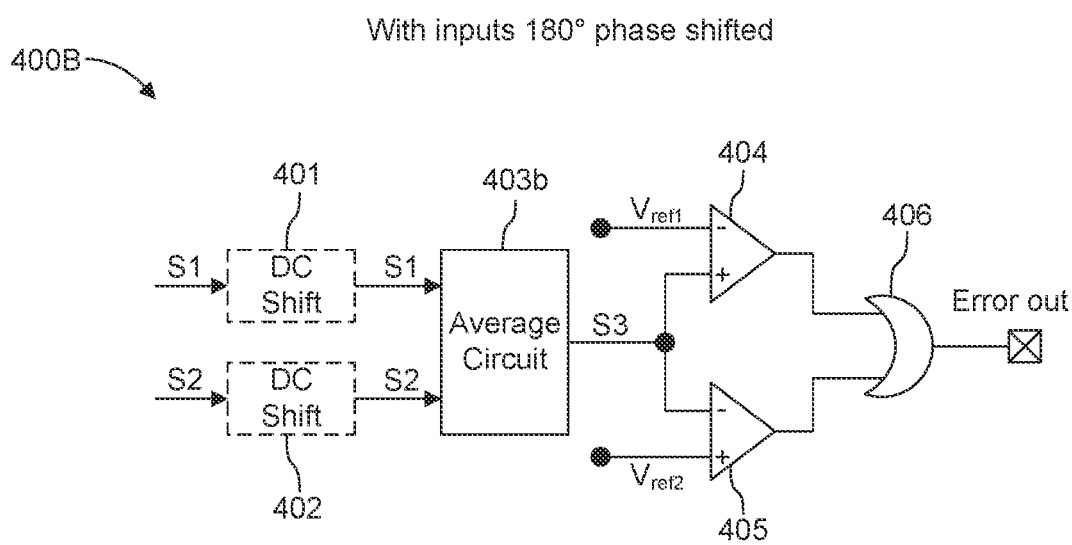
FIG. 4B is a schematic block diagram of a second type of evaluation circuit of a diagnostic circuit according to one or more embodiments.

FIG. 4B is a schematic block diagram of a second type of evaluation circuit 400B of a diagnostic circuit according to one or more embodiments. The evaluation circuit 400A is configured to evaluate two out-of-phase measurement signals S1 and S2.

The evaluation circuit 400A may include two optional DC shift circuits 401 and 402, as similarly described above. The measurement signals S1 and S2 are provided to an averaging circuit which generates a measurement offset signal S3 as the average of the two measurement signals S1 and S2. Ideally, the value of the measurement offset signal S3 should be 0 V or substantially 0 V since, over time, the average of the two measurement signals S1 and S2 should be equal or substantially equal under normal conditions. A window comparator circuit comprising two comparators 404 and 405 in parallel to determine if the measurement offset signal S3 is between two reference voltages Vref1 and Vref2. Reference voltage Vref1 may be a positive volage (e.g., 0.5 V, 1 V, etc.) and reference voltage Vref2 may be a negative volage (e.g., −0.5 V, −1 V, etc.). The two reference voltages Vref1 and Vref2 should be symmetric about a 0 V midpoint. If the measurement offset signal S3 is within the window (i.e., within the predetermined threshold range), the output of an OR gate 406 is low, signaling no fault. If the measurement offset signal S3 is outside of the window (i.e., is greater than Vref1 or less than Vref2 and thus outside the predetermined threshold range), the output of the OR gate 406 is high, signaling a fault or a potential fault.

It will become apparent from FIGS. 5-8 that any two pairs of out-of-phase measurements signals can be input to the evaluation circuit 400B and that measurements signals S1 and S2 are merely used as an example.

It will be appreciated that an optional phase shifter 410 may be included in the evaluation circuit 400A for evaluating out-of-phase signals. For example, the phase shifter 410 may be used to shift a measurement signal 180° to be in-phase with its paired measurement signal. By doing so, the two measurement signals are expected to be equal or substantially equal and their difference be zero or substantially zero. The phase setting of the phase shifter 410 may be considered 0° for in-phase signals and 180° (or other phase setting) for out-of-phase signals and may be adjustable according to its implementation.

Figure 4C:
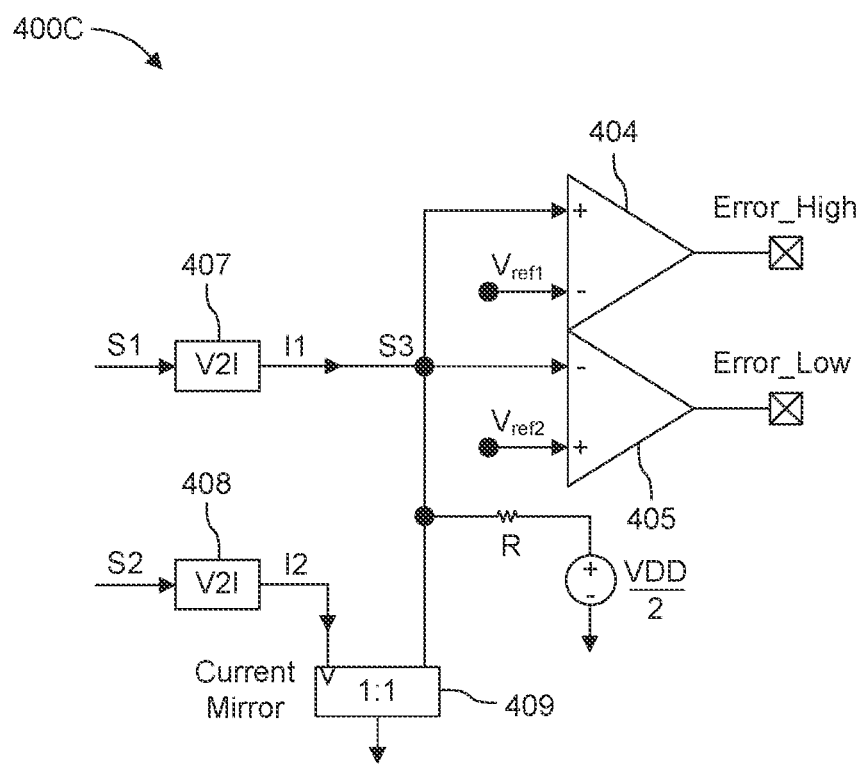
FIG. 4C is a schematic block diagram of a third type of evaluation circuit of a diagnostic circuit according to one or more embodiments.

FIG. 4C is a schematic block diagram of a third type of evaluation circuit 400C of a diagnostic circuit according to one or more embodiments. The evaluation circuit 400A is configured to evaluate two in-phase measurement signals S1 and S2 and can be used interchangeably with evaluation circuit 400C.

The evaluation circuit 400A may include two voltage-to-current converters 407 and 708 that convert the measurement signals S1 and S2 into current signals I1 and I2. Current signal I1 is connected to a common input node of the two comparators 404 and 405. Current signal I2 is connected to a 1:1 current mirror 409.

If S1 and S2 signals are two signals with the same DC and AC values superimposed then the outputs of the voltage-to-current converters 407 and 408 have the same current value and the resulting current injected in node S3 would be zero because the output current of current mirror 409 is I2=I1. In this case node S3 would receive the DC value imposed by the VDD/2 source, resulting in a voltage of VDD/2 at node S3 (S3=VDD/2). With node S3=VDD/2, if Vref1 and Vref 2 are symmetric about VDD/2 (e.g., VDD=1.5 V, S3=1.5 V/2=0.75 V, and Vref1=1 V and Vref2=0.5 V) then error_high and error_low are low.

If signals S1 and S2 have different DC or AC values this leads to a difference current injected into node S3 and resistor R. That current difference (delta I=I1−I2) would be injected into S3 node generating a voltage shift versus the normal VDD/2 voltage of node S3. This shift is deltaV=deltaI*R=(I1−I2)*R. If S3=VDD/2-deltaV is outside the threshold range set by Vref1 and Vref2, then the error_high signal or the error_low signal becomes high, respectively (not both in the same time), depending on whether the voltage at node S3 is greater than Vref1 or less than Vref2.

Thus, the two currents I1 and I2 result is a measurement offset signal S3 that is equal to or corresponds to a difference between the two currents. A window comparator circuit comprising two comparators 404 and 405 in parallel to determine if the measurement offset signal S3 is between two reference voltages Vref1 and Vref2. If either error output error_high or error_low signal high, a fault is signaled.

It will become apparent from FIGS. 5-8 that any two pairs of in-phase measurements signals can be input to the evaluation circuit 400C and that measurements signals S1 and S2 are merely used as an example.

Figure 5:
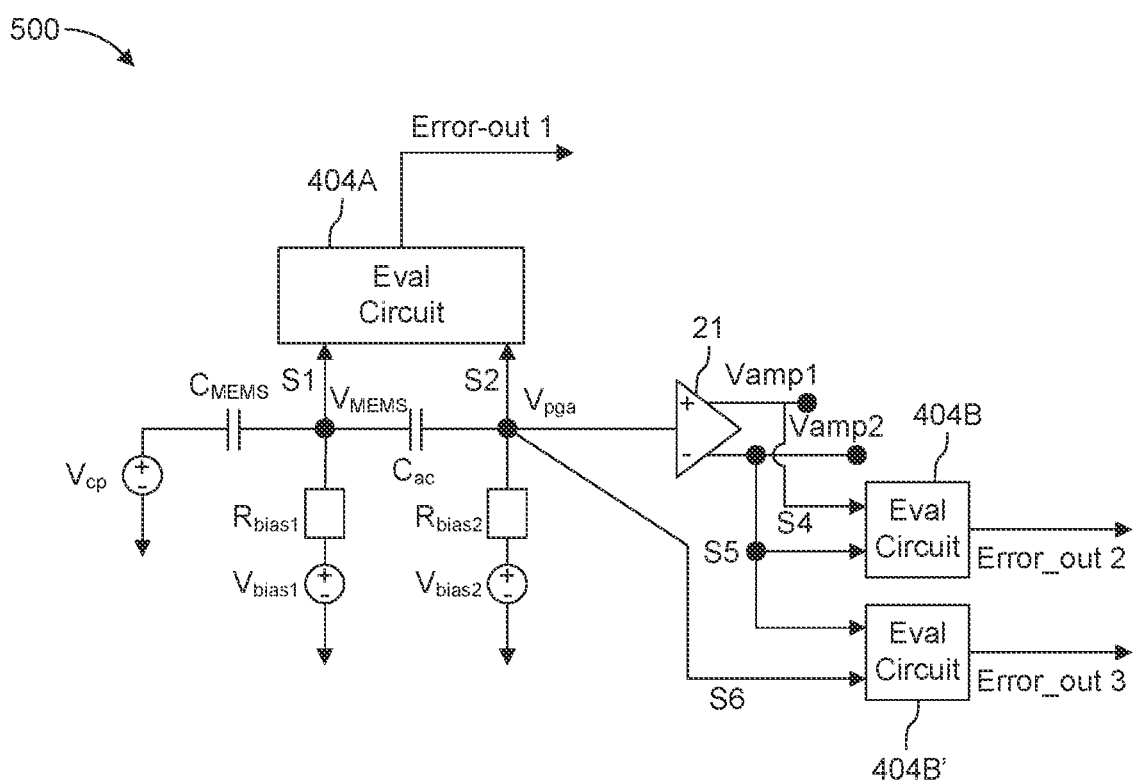
FIG. 5 is schematic block diagram of capacitive sensor read-out circuit according to one or more embodiments.

FIG. 5 is schematic block diagram of capacitive sensor read-out circuit 500 according to one or more embodiments. The capacitive sensor read-out circuit 500 is similar to 300A with the exception that the sense amplifier 21 is a differential amplifier with two outputs, including a non-inverting output and an inverting output. In particular, the sense amplifier 21 generates to amplified signals Vamp1 and Vamp 2 based on Vpga with Vamp1 being in-phase with respect to Vpga and with Vamp2 being 180° out-of-phase with respect to Vpga.

The capacitive sensor read-out circuit 500 shows a diagnostic circuit with three evaluation circuits 404A, 404B, and 404B'. Evaluation circuit 404A receives VMEMS and Vpga as measurements signals S1 and S2, respectively, and operates as described above with respect to FIG. 4A. Evaluation circuit 404B receives Vamp1 and Vamp2 as measurements signals S4 and S5, respectively, and operates as described above with respect to FIG. 4B. Evaluation circuit 404B' receives Vamp2 and Vpga as measurements signals S5 and S6, respectively, and operates as described above with respect to FIG. 4B.

Each of the three evaluation circuits 404A, 404B, and 404B' calculate a respective offset measurement that is representative of a degree of pattern similarity for its pair of measurement signals and generates a fault at error_out1, error_out2, or error_out3 if the respective offset measurement exceeds its threshold range.

Figure 6:
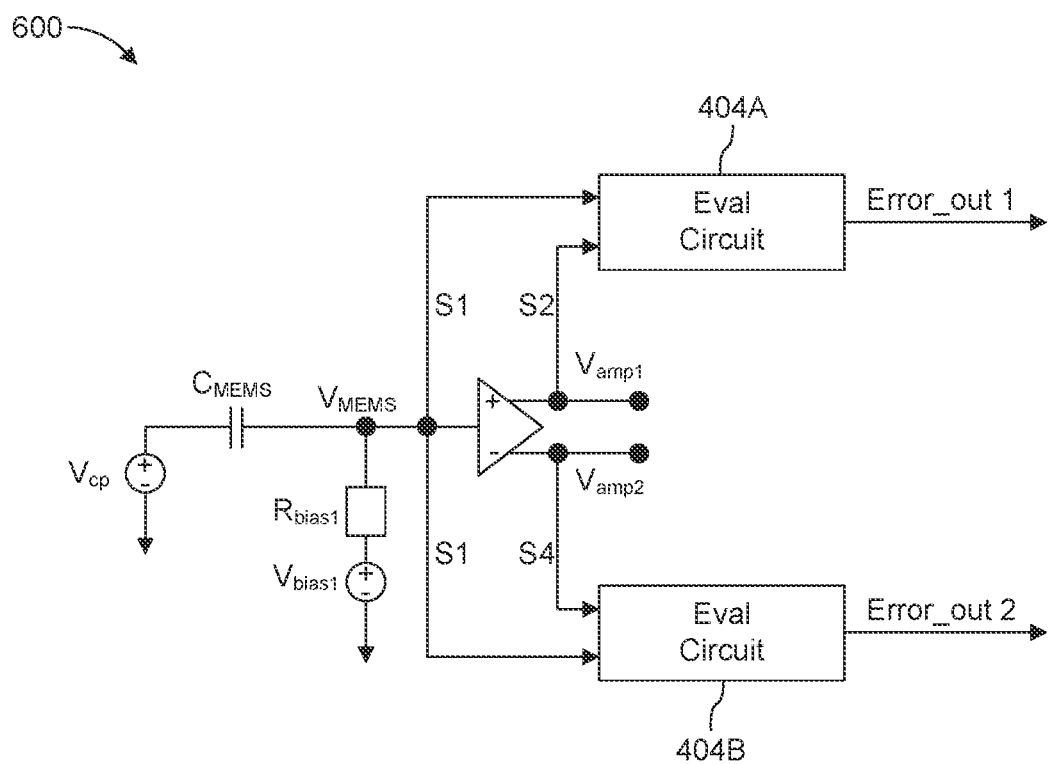
FIG. 6 is schematic block diagram of capacitive sensor read-out circuit according to one or more embodiments.

FIG. 6 is schematic block diagram of capacitive sensor read-out circuit 600 according to one or more embodiments. The capacitive sensor read-out circuit 600 is similar to 300A with the exception that the sense amplifier 21 is a differential amplifier with two outputs, including a non-inverting output and an inverting output, and the output voltage VMEMS of the MEMS capacitor CMEMS is coupled to the amplifier input of the sense amplifier 21 without an AC capacitor therebetween. Thus, the sense amplifier 21 generates to amplified signals Vamp1 and Vamp 2 based on VMEMS with Vamp1 being in-phase with respect to VMEMS and with Vamp2 being 180° out-of-phase with respect to VMEMS.

The capacitive sensor read-out circuit 600 shows a diagnostic circuit with two evaluation circuits 404A and 404B. Evaluation circuit 404A receives VMEMS and Vamp1 as measurements signals S1 and S2, respectively, and operates as described above with respect to FIG. 4A. Evaluation circuit 404B receives VMEMS and Vamp2 as measurements signals S1 and S4, respectively, and operates as described above with respect to FIG. 4B.

Each of the two evaluation circuits 404A and 404B calculate a respective offset measurement that is representative of a degree of pattern similarity for its pair of measurement signals and generates a fault at error_out1 or error_out2 if the respective offset measurement exceeds its threshold range.

Figure 7:
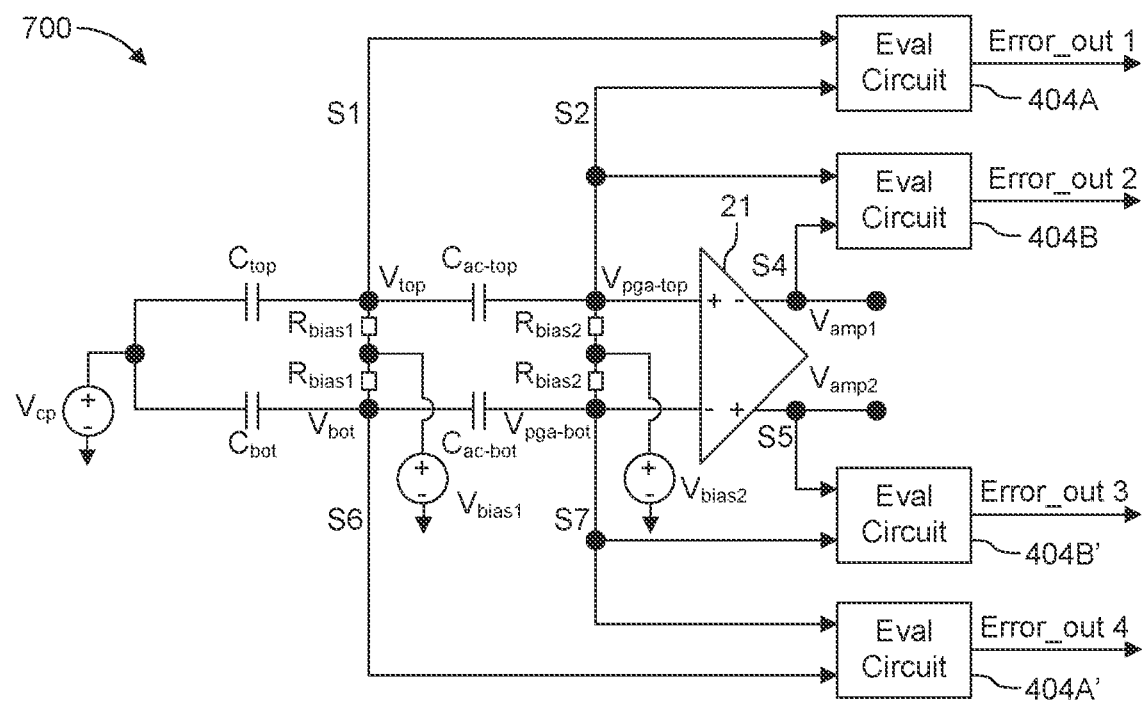
FIG. 7 is schematic block diagram of capacitive sensor read-out circuit according to one or more embodiments.

FIG. 7 is schematic block diagram of capacitive sensor read-out circuit 700 according to one or more embodiments. The capacitive sensor read-out circuit 700 is similar to 300B with the exception that outputs of the sense amplifier 21 are both inverting outputs. In particular, the sense amplifier 21 generates amplified signal Vamp1 as in inversion of Vpga_top and generates amplified signal Vamp 2 as an inversion of Vpga_bot. As before, Vamp1 and Vamp2 are 180° out-of-phase with respect to each other.

The capacitive sensor read-out circuit 700 shows a diagnostic circuit with four evaluation circuits 404A, 404A', 404B, and 404B'. Evaluation circuit 404A receives VTop and Vpga_top as measurements signals S1 and S2, respectively, and operates as described above with respect to FIG. 4A. Evaluation circuit 404A' receives VBot and Vpga_bot as measurements signals S6 and S7, respectively, and operates as described above with respect to FIG. 4A. Evaluation circuit 404B receives Vpga_top and Vamp1 as measurements signals S2 and S4, respectively, and operates as described above with respect to FIG. 4B. Evaluation circuit 404B' receives Vpga_bot and Vamp2 as measurements signals S7 and S5, respectively, and operates as described above with respect to FIG. 4B.

Each of the four evaluation circuits 404A, 404A', 404B, and 404B' calculate a respective offset measurement that is representative of a degree of pattern similarity for its pair of measurement signals and generates a fault at error_out1, error_out2, error_out3, or error_out4 if the respective offset measurement exceeds its threshold range.

Figure 8:
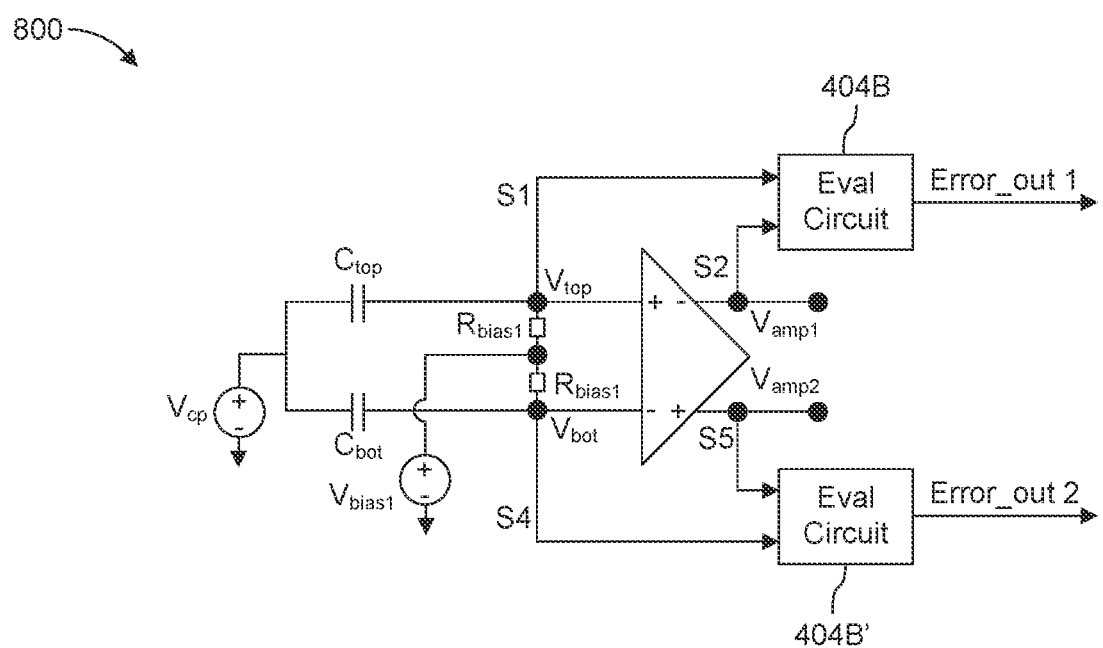
FIG. 8 is schematic block diagram of capacitive sensor read-out circuit according to one or more embodiments.

FIG. 8 is schematic block diagram of capacitive sensor read-out circuit 800 according to one or more embodiments. The capacitive sensor read-out circuit 800 is similar to 300B with the exception that the outputs of the sense amplifier 21 are both inverting outputs., and the output voltages VTop and VBot of the MEMS capacitors CTop and CBot are coupled to the amplifier inputs of the sense amplifier 21 without an AC capacitor therebetween. Thus, the sense amplifier 21 generates amplified signal Vamp1 as in inversion of VTop and generates amplified signal Vamp 2 as an inversion of Vbot. As before, Vamp1 and Vamp2 are 180° out-of-phase with respect to each other.

The capacitive sensor read-out circuit 800 shows a diagnostic circuit with two evaluation circuits 404B and 404B'. Evaluation circuit 404B receives VTop and Vamp1 as measurements signals S1 and S2, respectively, and operates as described above with respect to FIG. 4B. Evaluation circuit 404B' receives VBot and Vamp2 as measurements signals S4 and S5, respectively, and operates as described above with respect to FIG. 4B.

Each of the two evaluation circuits 404B and 404B' calculate a respective offset measurement that is representative of a degree of pattern similarity for its pair of measurement signals and generates a fault at error_out1 or error_out2 if the respective offset measurement exceeds its threshold range.

The diagnostic circuits illustrated in FIGS. 5-8 provide the advantage that it does not need a low pass filter, which is typically large due to the required low cut off frequency around 5 Hz. The diagnostic circuits are also capable of diagnosing faults other than leakage current faults, including faults in the bias circuits and at the sense amplifier. The diagnosis circuit also provides evaluation circuits of relatively low-complexity and reasonable area expenditure, which lowers manufacturing cost and meets size constraints. The diagnostic circuits can be used for differential signal paths duplicating the circuit for both negative/positive paths, which again saves chip area.

Figure 9:
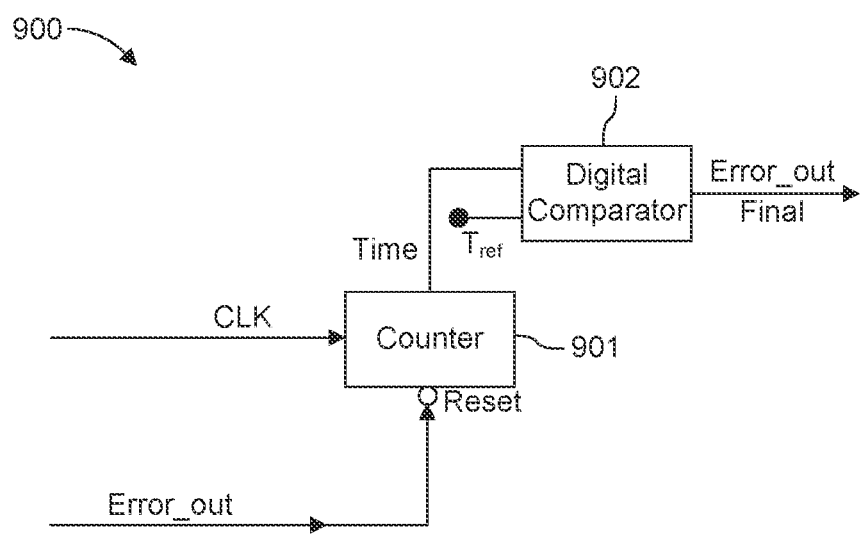
FIG. 9 is schematic block diagram of an error processing circuit of a capacitive sensor read-out circuit according to one or more embodiments.

FIG. 9 is schematic block diagram of an error processing circuit 900 of a capacitive sensor read-out circuit according to one or more embodiments. The error processing circuit 900 is configured to receive a fault signal (e.g., error_out1, error_out2, error_out3, or error_out4) from an evaluation circuit 404A, 404B, or 404C in order to verify that a fault has actually occurred, instead of the result of jitter or other type of signaling error. In other words, the error processing circuit 900 may be a type of deglitch filter that filters glitches from the fault signal in order to filter out false fault signaling.

In general, the error processing circuit 900 configured to receive the first fault signal (error_out) from one of the evaluation circuits 404A, 404B, or 404C and generate a second fault signal (error_out final) in response to the first fault signal being activated, uninterrupted, for a predetermined time interval, where the second fault signal is indicative of a confirmation of the first fault. In other words, the error processing circuit 900 generates the second fault signal (error_out final) in response to the offset measurement signal S3 remaining outside of a threshold range for the predetermined time interval.

The error processing circuit 900 includes a counter 901 and a digital comparator 902. The counter 901 receives the first fault signal (error_out) from one of the evaluation circuits 404A, 404B, or 404C and a clock signal CLK from which an increment rate is based. The counter 901 increments a counter value at each clock pulse that the first fault signal (error_out) is high and resets the counter value any time a clock pulse is received and the first fault signal (error_out) is low. The counter 901 outputs a time value (e.g., a voltage or a code that represents the counter value) and the digital comparator 902 compares the time value to a reference threshold Tref that corresponds to a predetermined time interval. If the time value is less than the reference threshold Tref, the output of the digital comparator 902 remains low, indicating no fault. On the other hand, if the time value is equal to or greater than the reference threshold Tref, the output of the digital comparator 902 is switched high, indicating a confirmed fault. Thus, the first fault signal (error_out) must remain high for an entire duration of the predetermined time interval to trigger the second fault signal (error_out final), otherwise the output of the digital comparator 902 remains low.

Additional example embodiments are provided below.

1. A capacitive sensor, comprising: a first conductive structure; a second conductive structure that is counter to the first conductive structure, wherein at the second conductive structure is movable relative to the first conductive structure in response to an external force acting thereon, wherein the second conductive structure is capacitively coupled to the first conductive structure to form a first capacitor having a first capacitance that changes with a change in a distance between the first conductive structure and second conductive structure, wherein the first capacitance is representative of the external force and the first capacitor comprises a first MEMS output configured to output a first sense signal representative of the first capacitance; a second capacitor comprising a first terminal and a second terminal, the first terminal being coupled to the first MEMS output of the first capacitor in order to receive the first sense signal and the second terminal being configured to output a second sense signal based on the first sense signal;

an amplifier comprising a first amplifier input coupled to the second terminal of the second capacitor and configured to output a first amplified signal based on the second sense signal; and a diagnostic circuit configured to receive one of the first sense signal, the second sense signal, or the first amplified signal as a first measurement signal, receive a different one of the first sense signal, the second sense signal, or the first amplified signal as a second measurement signal, generate an first offset measurement based on the first measurement signal and the second measurement signal, wherein the first offset measurement is representative of a degree of pattern similarity between the first measurement signal and the second measurement signal, compare the first offset measurement to a first threshold range defined by a first threshold and a second threshold, and detect a first fault on a condition that the first offset measurement is outside of the first threshold range.

2. The capacitive sensor of embodiment 1, wherein: the first sense signal is the first measurement signal and the second sense signal is the second measurement signal, and the diagnostic circuit comprises a difference circuit configured to generate the first offset measurement as a difference between the first measurement signal and the second measurement signal.

3. The capacitive sensor of embodiment 2, wherein the first offset measurement is a difference between a DC value of the first measurement signal and a DC value of the second measurement signal.

4. The capacitive sensor of embodiment 2, wherein the first sense signal comprises a first AC component and a first DC component, the second sense signal comprises a second AC component and a second DC component, wherein the first AC component and the second AC component are in phase with each other.

5. The capacitive sensor of embodiment 2, wherein the diagnostic circuit comprises a first DC shifter configured to shift the first DC component to a mid-supply value and a second DC shifter configured to shift the second DC component to the mid-supply value.

6. The capacitive sensor of embodiment 2, wherein the diagnostic circuit comprises: a first voltage-to-current converter configured to generate the first measurement signal by converting the first sense signal into a first current; and a second voltage-to-current converter configured to generate the second measurement signal by converting the second sense signal into a second current.

7. The capacitive sensor of embodiment 1, wherein: the first sense signal is the first measurement signal and the first amplified signal is the second measurement signal, and the diagnostic circuit comprises a difference circuit configured to generate the first offset measurement as a difference between the first measurement signal and the second measurement signal.

8. The capacitive sensor of embodiment 7, wherein: the first sense signal comprises a first AC component and a first DC component and the first amplified signal comprises a second AC component and a second DC component, the first AC component and the second AC component are in phase with each other, and the first offset measurement is a difference between the first DC component of the first measurement signal and the second DC component of the second measurement signal.

9. The capacitive sensor of embodiment 1, wherein: the first sense signal is the first measurement signal and the first amplified signal is the second measurement signal, and the diagnostic circuit comprises an averaging circuit configured to generate the first offset measurement as an average of the first measurement signal and the second measurement signal.

10. The capacitive sensor of embodiment 9, wherein: the first sense signal comprises a first AC component and a first DC component and the first amplified signal comprises a second AC component and a second DC component, the first AC component and the second AC component are 180° out of phase with each other, and the first offset measurement is an average of the first DC component of the first measurement signal and the second DC component of the second measurement signal.

11. The capacitive sensor of embodiment 1, wherein: the second sense signal is the first measurement signal and the first amplified signal is the second measurement signal, and the diagnostic circuit comprises a difference circuit configured to generate the first offset measurement as a difference between the first measurement signal and the second measurement signal.

12. The capacitive sensor of embodiment 11, wherein: the second sense signal comprises a first AC component and a first DC component and the first amplified signal comprises a second AC component and a second DC component, the first AC component and the second AC component are in phase with each other, and the first offset measurement is a difference between the first DC component of the first measurement signal and the second DC component of the second measurement signal.

13. The capacitive sensor of embodiment 1, wherein: the second sense signal is the first measurement signal and the first amplified signal is the second measurement signal, and the diagnostic circuit comprises an averaging circuit configured to generate the first offset measurement as an average of the first measurement signal and the second measurement signal.

14. The capacitive sensor of embodiment 13, wherein: the second sense signal comprises a first AC component and a first DC component and the first amplified signal comprises a second AC component and a second DC component, the first AC component and the second AC component are 180° out of phase with each other, and the first offset measurement is an average of the first DC component of the first measurement signal and the second DC component of the second measurement signal.

15. The capacitive sensor of embodiment 1, further comprising: a third conductive structure that is counter to the first conductive structure, wherein the third conductive structure is movable relative to the first conductive structure, wherein the third conductive structure is capacitively coupled to the first conductive structure to form a third capacitor having a third capacitance that changes with a change in a distance between the first conductive structure and third conductive structure, wherein the third capacitance is representative of the external force and the third capacitor comprises a second MEMS output configured to output a third sense signal representative of the third capacitance; and a fourth capacitor comprising a third terminal and a fourth terminal, the third terminal being coupled to the second MEMS output of the third capacitor in order to receive the third sense signal and the fourth terminal being configured to output a fourth sense signal based on the third sense signal, wherein the amplifier further comprises a second amplifier input coupled to the fourth terminal of the fourth capacitor and configured to output a second amplified signal based on the fourth sense signal, and wherein the diagnostic circuit is further configured to receive one of the third sense signal, the fourth sense signal, or the second amplified signal as a third measurement signal, receive a different one of the third sense signal, the fourth sense signal, or the second amplified signal as a fourth measurement signal, generate a second offset measurement based on the third measurement signal and the fourth measurement signal, wherein the second offset measurement is representative of a degree of pattern similarity between the third measurement signal and the fourth measurement signal, compare the second offset measurement to a second threshold range defined by a third threshold and a fourth threshold, and detect a second fault on a condition that the second offset measurement is outside of the second threshold range.

16. The capacitive sensor of embodiment 1, wherein the detected first fault is indicative of a leakage current in the capacitive sensor.

17. The capacitive sensor of embodiment 1, wherein the external force is an AC external force.

18. The capacitive sensor of embodiment 1, wherein the diagnostic circuit comprises: a comparator circuit configured to compare the first offset measurement to the first threshold range and activate a first fault signal on the condition that the first offset measurement is outside of the first threshold range; and an error processing circuit configured to receive the first fault signal and generate a second fault signal in response to the first fault signal being activated, uninterrupted, for a predetermined time interval, wherein the second fault signal is indicative of a confirmation of the first fault.

19. The capacitive sensor of embodiment 1, wherein the diagnostic circuit comprises: a deglitch filter configured to generate a first fault signal in response to the first offset measurement remaining outside of the first threshold range for a predetermined time interval.

20. A capacitive sensor, comprising: a first conductive structure; a second conductive structure that is counter to the first conductive structure, wherein at the second conductive structure is movable relative to the first conductive structure in response to an external force acting thereon, wherein the second conductive structure is capacitively coupled to the first conductive structure to form a first capacitor having a first capacitance that changes with a change in a distance between the first conductive structure and second conductive structure, wherein the first capacitance is representative of the external force and the first capacitor comprises a first MEMS output configured to output a first sense signal representative of the first capacitance; a second capacitor comprising a first terminal and a second terminal, the first terminal being coupled to the first MEMS output of the first capacitor in order to receive the first sense signal and the second terminal being configured to output a second sense signal based on the first sense signal; an amplifier comprising a first amplifier input coupled to the second terminal of the second capacitor and configured to output a first amplified signal and a second amplified signal based on the second sense signal, wherein the first amplified signal is in phase with the second sense signal and the second amplified signal is 180° out of phase with the second sense signal; and a diagnostic circuit configured to receive a first pair of signals including the first amplified signal and the second amplified signal, generate a first offset measurement based on the first pair of signals, wherein the first offset measurement is representative of a degree of pattern similarity between the first amplified signal and the second amplified signal, compare the first offset measurement to a first threshold range defined by a first threshold and a second threshold, and detect a first fault on a condition that the first offset measurement is outside of the first threshold range.

21. The capacitive sensor of embodiment 20, wherein the diagnostic circuit comprises an averaging circuit configured to generate the first offset measurement as an average of the first amplified signal and the second amplified signal.

22. The capacitive sensor of embodiment 21, wherein: the first amplified signal comprises a first AC component and a first DC component and the second amplified signal comprises a second AC component and a second DC component, the first AC component and the second AC component are 180° out of phase with each other, and the first offset measurement is an average of the first DC component of the first amplified signal and the second DC component of the second amplified signal.

23. The capacitive sensor of embodiment 20, wherein the diagnostic circuit comprises: at least one phase shifter configured to align a phase of the first amplified signal with a phase of the second amplified signal; and a difference circuit arranged downstream from the at least one phase shifter and configured to generate the first offset measurement as a difference between the first amplified signal and the second amplified signal.

24. The capacitive sensor of embodiment 20, where the diagnostic circuit is further configured to receive a second pair of signals including the second sense signal and the second amplified signal, generate a second offset measurement based on the second pair of signals, wherein the second offset measurement is representative of a degree of pattern similarity between the second sense signal and the second amplified signal, compare the second offset measurement to a second threshold range defined by a third threshold and a fourth threshold, and detect a second fault on a condition that the second offset measurement is outside of the second threshold range.

25. The capacitive sensor of embodiment 20, where the diagnostic circuit is further configured to receive a second pair of signals including the first sense signal and the second sense signal, generate a second offset measurement based on the second pair of signals, wherein the second offset measurement is representative of a degree of pattern similarity between the first sense signal and the second sense signal, compare the second offset measurement to a second threshold range defined by a third threshold and a fourth threshold, and detect a second fault on a condition that the second offset measurement is outside of the second threshold range.

26. A capacitive sensor, comprising: a first conductive structure; a second conductive structure that is counter to the first conductive structure, wherein at the second conductive structure is movable relative to the first conductive structure in response to an external force acting thereon, wherein the second conductive structure is capacitively coupled to the first conductive structure to form a first capacitor having a first capacitance that changes with a change in a distance between the first conductive structure and second conductive structure, wherein the first capacitance is representative of the external force and the first capacitor comprises a first MEMS output configured to output a first sense signal representative of the first capacitance; an amplifier comprising a first amplifier input coupled to the first MEMS output for receiving the first sense signal and configured to output a first amplified signal and a second amplified signal based on the first sense signal, wherein the first amplified signal is in phase with the first sense signal and the second amplified signal is 180° out of phase with the first sense signal; and a diagnostic circuit configured to: receive a first pair of signals including the first sense signal and the first amplified signal, generate a first offset measurement based on the first pair of signals, wherein the first offset measurement is representative of a degree of pattern similarity between the first sense signal and the first amplified signal, compare the first offset measurement to a first threshold range defined by a first threshold and a second threshold, and detect a first fault on a condition that the first offset measurement is outside of the first threshold range, or receive a second pair of signals including the first sense signal and the second amplified signal, generate a second offset measurement based on the second pair of signals, wherein the second offset measurement is representative of a degree of pattern similarity between the first sense signal and the second amplified signal, compare the second offset measurement to a second threshold range defined by a third threshold and a fourth threshold, and detect a second fault on a condition that the second offset measurement is outside of the second threshold range.

27. The capacitive sensor of embodiment 26, wherein the diagnostic circuit is configured to: receive a first pair of signals including the first sense signal and the first amplified signal, generate a first offset measurement based on the first pair of signals, wherein the first offset measurement is representative of a degree of pattern similarity between the first sense signal and the first amplified signal, compare the first offset measurement to a first threshold range defined by a first threshold and a second threshold, and detect a first fault on a condition that the first offset measurement is outside of the first threshold range, and receive a second pair of signals including the first sense signal and the second amplified signal, generate a second offset measurement based on the second pair of signals, wherein the second offset measurement is representative of a degree of pattern similarity between the first sense signal and the second amplified signal, compare the second offset measurement to a second threshold range defined by a third threshold and a fourth threshold, and detect a second fault on a condition that the second offset measurement is outside of the second threshold range.

28. The capacitive sensor of embodiment 27, wherein the diagnostic circuit comprises: a difference circuit configured to generate the first offset measurement as a difference between the first sense signal and the first amplified signal; and an averaging circuit configured to generate the second offset measurement as an average of the first sense signal and the second amplified signal.

29. The capacitive sensor of embodiment 27, wherein the diagnostic circuit comprises: at least one phase shifter configured to align a phase of the first sense signal with a phase of the second amplified signal; a first difference circuit configured to generate the first offset measurement as a difference between the first sense signal and the first amplified signal; and a second difference circuit arranged downstream from the at least one phase shifter and configured to generate the second offset measurement as a difference between the first sense signal and the second amplified signal.

30. A capacitive sensor, comprising: a first conductive structure; a second conductive structure that is counter to the first conductive structure, wherein at the second conductive structure is movable relative to the first conductive structure in response to an external force acting thereon, wherein the second conductive structure is capacitively coupled to the first conductive structure to form a first capacitor having a first capacitance that changes with a change in a distance between the first conductive structure and second conductive structure, wherein the first capacitance is representative of the external force and the first capacitor comprises a first MEMS output configured to output a first sense signal representative of the first capacitance; a third conductive structure that is counter to the first conductive structure, wherein the third conductive structure is movable relative to the first conductive structure, wherein the third conductive structure is capacitively coupled to the first conductive structure to form a second capacitor having a second capacitance that changes with a change in a distance between the first conductive structure and third conductive structure, wherein the second capacitance is representative of the external force and the second capacitor comprises a second MEMS output configured to output a second sense signal representative of the second capacitance; an amplifier comprising a first amplifier input coupled to the first MEMS output for receiving the first sense signal and configured to output a first amplified signal based on the first sense signal and comprising a second amplifier input coupled to the second MEMS output and configured to output a second amplified signal based on the second sense signal; and a diagnostic circuit configured to receive a first pair of signals including the first sense signal and the first amplified signal, generate a first offset measurement based on the first pair of signals, wherein the first offset measurement is representative of a degree of pattern similarity between the first sense signal and the first amplified signal, compare the first offset measurement to a first threshold range defined by a first threshold and a second threshold, and detect a first fault on a condition that the first offset measurement is outside of the first threshold range.

31. The capacitive sensor of embodiment 30, wherein the diagnostic circuit is further configured to receive a second pair of signals including the second sense signal and the second amplified signal, generate a second offset measurement based on the second pair of signals, wherein the second offset measurement is representative of a degree of pattern similarity between the second sense signal and the second amplified signal, compare the second offset measurement to a second threshold range defined by a third threshold and a fourth threshold, and detect a second fault on a condition that the second offset measurement is outside of the second threshold range.

While various embodiments have been described, it will be apparent to those of ordinary skill in the art that many more embodiments and implementations are possible within the scope of the disclosure. Accordingly, the invention is not to be restricted except in light of the attached claims and their equivalents.

With regard to the various functions performed by the components or structures described above (assemblies, devices, circuits, systems, etc.), the terms (including a reference to a "means") used to describe such components are intended to correspond, unless otherwise indicated, to any component or structure that performs the specified function of the described component (i.e., that is functionally equivalent), even if not structurally equivalent to the disclosed structure that performs the function in the exemplary implementations of the invention illustrated herein.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim.

Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

In summary, although various exemplary embodiments have been disclosed, it will be apparent to those skilled in the art that various changes and modifications can be made which will achieve some of the advantages of the concepts disclosed herein without departing from the spirit and scope of the invention. It will be obvious to those reasonably skilled in the art that other components performing the same functions may be suitably substituted. It is to be understood that other embodiments may be utilized, and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

What is claimed is:

1. A capacitive sensor, comprising:
    a first conductive structure;
    a second conductive structure that is different from the first conductive structure, wherein at the second conductive structure is movable relative to the first conductive structure in response to an external force acting thereon, wherein the second conductive structure is capacitively coupled to the first conductive structure to form a first capacitor having a first capacitance that changes with a change in a distance between the first conductive structure and second conductive structure, wherein the first capacitance is representative of the external force and the first capacitor comprises a first micro-electromechanical system (MEMS) output configured to output a first sense signal representative of the first capacitance;
    a second capacitor comprising a first terminal and a second terminal, the first terminal being coupled to the first MEMS output of the first capacitor in order to receive the first sense signal and the second terminal being configured to output a second sense signal based on the first sense signal;
    an amplifier comprising a first amplifier input coupled to the second terminal of the second capacitor and configured to output a first amplified signal based on the second sense signal; and
    a diagnostic circuit configured to receive one of the first sense signal, the second sense signal, or the first amplified signal as a first measurement signal, receive one of the first sense signal, the second sense signal, or the first amplified signal as a second measurement signal that is different from the first measurement signal, generate a first offset measurement based on the first measurement signal and the second measurement signal, wherein the first offset measurement is representative of a degree of pattern similarity between the first measurement signal and the second measurement signal, compare the first offset measurement to a first threshold range defined by a first threshold and a second threshold, and detect a first fault on a condition that the first offset measurement is outside of the first threshold range,
    wherein the diagnostic circuit comprises:
        a comparator circuit configured to compare the first offset measurement to the first threshold range and activate a first fault signal on the condition that the first offset measurement is outside of the first threshold range; and
        an error processing circuit configured to receive the first fault signal and generate a second fault signal in response to the first fault signal being activated, uninterrupted, for a predetermined time interval, wherein the second fault signal is indicative of a confirmation of the first fault.

2. The capacitive sensor of claim 1, wherein:
    the first sense signal is the first measurement signal and the second sense signal is the second measurement signal, and
    the diagnostic circuit comprises a difference circuit configured to generate the first offset measurement as a difference between the first measurement signal and the second measurement signal.

3. The capacitive sensor of claim 2, wherein the first offset measurement is a difference between a direct current (DC) value of the first measurement signal and a DC value of the second measurement signal.

4. The capacitive sensor of claim 2, wherein the first sense signal comprises a first alternating current (AC) component and a first direct current (DC) component, the second sense signal comprises a second AC component and a second DC component, wherein the first AC component and the second AC component are in phase with each other.

5. The capacitive sensor of claim 2, wherein the diagnostic circuit comprises a first DC shifter configured to shift a first DC component to a mid-supply value and a second direct current (DC) shifter configured to shift a second DC component to the mid-supply value.

6. The capacitive sensor of claim 2, wherein the diagnostic circuit comprises:
    a first voltage-to-current converter configured to generate the first measurement signal by converting the first sense signal into a first current; and
    a second voltage-to-current converter configured to generate the second measurement signal by converting the second sense signal into a second current.

7. The capacitive sensor of claim 1, wherein:
    the first sense signal is the first measurement signal and the first amplified signal is the second measurement signal, and
    the diagnostic circuit comprises a difference circuit configured to generate the first offset measurement as a difference between the first measurement signal and the second measurement signal.

8. The capacitive sensor of claim 7, wherein:
    the first sense signal comprises a first alternating current (AC) component and a first direct current (DC) component and the first amplified signal comprises a second AC component and a second DC component, the first AC component and the second AC component are in phase with each other, and the first offset measurement is a difference between the first DC component and the second DC component.

9. The capacitive sensor of claim 1, wherein:

the first sense signal is the first measurement signal and the first amplified signal is the second measurement signal, and the diagnostic circuit comprises an averaging circuit configured to generate the first offset measurement as an average of the first measurement signal and the second measurement signal.

10. The capacitive sensor of claim 9, wherein:

the first sense signal comprises a first alternating current (AC) component and a first direct current (DC) component and the first amplified signal comprises a second AC component and a second DC component, the first AC component and the second AC component are 180° out of phase with each other, and the first offset measurement is an average of the first DC component of the first measurement signal and the second DC component of the second measurement signal.

11. The capacitive sensor of claim 1, wherein:

the second sense signal is the first measurement signal and the first amplified signal is the second measurement signal, and the diagnostic circuit comprises a difference circuit configured to generate the first offset measurement as a difference between the first measurement signal and the second measurement signal.

12. The capacitive sensor of claim 11, wherein:

the second sense signal comprises a first alternating current (AC) component and a first direct current (DC) component and the first amplified signal comprises a second AC component and a second DC component, the first AC component and the second AC component are in phase with each other, and the first offset measurement is a difference between the first DC component of the first measurement signal and the second DC component of the second measurement signal.

13. The capacitive sensor of claim 1, wherein:

the second sense signal is the first measurement signal and the first amplified signal is the second measurement signal, and the diagnostic circuit comprises an averaging circuit configured to generate the first offset measurement as an average of the first measurement signal and the second measurement signal.

14. The capacitive sensor of claim 13, wherein:

the second sense signal comprises a first alternating current (AC) component and a first direct current (DC) component and the first amplified signal comprises a second AC component and a second DC component, the first AC component and the second AC component are 180° out of phase with each other, and the first offset measurement is an average of the first DC component and the second DC component.

15. The capacitive sensor of claim 1, further comprising;

a third conductive structure that is different from the first conductive structure, wherein the third conductive structure is movable relative to the first conductive structure, wherein the third conductive structure is capacitively coupled to the first conductive structure to form a third capacitor having a third capacitance that changes with a change in a distance between the first conductive structure and third conductive structure, wherein the third capacitance is representative of the external force and the third capacitor comprises a second MEMS output configured to output a third sense signal representative of the third capacitance; and a fourth capacitor comprising a third terminal and a fourth terminal, the third terminal being coupled to the second MEMS output of the third capacitor in order to receive the third sense signal and the fourth terminal being configured to output a fourth sense signal based on the third sense signal, wherein the amplifier further comprises a second amplifier input coupled to the fourth terminal of the fourth capacitor and configured to output a second amplified signal based on the fourth sense signal, and wherein the diagnostic circuit is further configured to receive one of the third sense signal, the fourth sense signal, or the second amplified signal as a third measurement signal, receive a different one of the third sense signal, the fourth sense signal, or the second amplified signal as a fourth measurement signal, generate a second offset measurement based on the third measurement signal and the fourth measurement signal, wherein the second offset measurement is representative of a degree of pattern similarity between the third measurement signal and the fourth measurement signal, compare the second offset measurement to a second threshold range defined by a third threshold and a fourth threshold, and detect a second fault on a condition that the second offset measurement is outside of the second threshold range.

16. The capacitive sensor of claim 1, wherein the detected first fault is indicative of a leakage current in the capacitive sensor.

17. The capacitive sensor of claim 1, wherein the external force is an alternating current (AC) external force.

18. The capacitive sensor of claim 1, wherein the diagnostic circuit comprises:

a deglitch filter configured to generate a first fault signal in response to the first offset measurement remaining outside of the first threshold range for a predetermined time interval.

19. A capacitive sensor, comprising:

a first conductive structure;

a second conductive structure that is counter to the first conductive structure, wherein the second conductive structure is movable relative to the first conductive structure in response to an external force acting thereon, wherein the second conductive structure is capacitively coupled to the first conductive structure to form a first capacitor having a first capacitance that changes with a change in a distance between the first conductive structure and second conductive structure, wherein the first capacitance is representative of the external force and the first capacitor comprises a first micro-electromechanical (MEMS) output configured to output a first sense signal representative of the first capacitance;

a second capacitor comprising a first terminal and a second terminal, the first terminal being coupled to the first MEMS output of the first capacitor in order to receive the first sense signal and the second terminal being configured to output a second sense signal based on the first sense signal;

an amplifier comprising a first amplifier input coupled to the second terminal of the second capacitor and configured to output a first amplified signal and a second amplified signal based on the second sense signal, wherein the first amplified signal is in phase with the second sense signal and the second amplified signal is 180° out of phase with the second sense signal; and
a diagnostic circuit configured to receive a first pair of signals including the first amplified signal and the second amplified signal, generate a first offset measurement based on the first pair of signals, wherein the first offset measurement is representative of a degree of pattern similarity between the first amplified signal and the second amplified signal, compare the first offset measurement to a first threshold range defined by a first threshold and a second threshold, and detect a first fault on a condition that the first offset measurement is outside of the first threshold range,
wherein the diagnostic circuit comprises:
a comparator circuit configured to compare the first offset measurement to the first threshold range and activate a first fault signal on the condition that the first offset measurement is outside of the first threshold range; and
an error processing circuit configured to receive the first fault signal and generate a second fault signal in response to the first fault signal being activated, uninterrupted, for a predetermined time interval, wherein the second fault signal is indicative of a confirmation of the first fault.

20. The capacitive sensor of claim 19, wherein the diagnostic circuit comprises an averaging circuit configured to generate the first offset measurement as an average of the first amplified signal and the second amplified signal.

21. The capacitive sensor of claim 20, wherein:
the first amplified signal comprises a first alternating current (AC) component and a first direct current (DC) component and the second amplified signal comprises a second AC component and a second DC component,
the first AC component and the second AC component are 180° out of phase with each other, and
the first offset measurement is an average of the first DC component of the first amplified signal and the second DC component of the second amplified signal.

22. The capacitive sensor of claim 19, wherein the diagnostic circuit comprises:
at least one phase shifter configured to align a phase of the first amplified signal with a phase of the second amplified signal; and
a difference circuit arranged downstream from the at least one phase shifter and configured to generate the first offset measurement as a difference between the first amplified signal and the second amplified signal.

23. The capacitive sensor of claim 19, where the diagnostic circuit is further configured to receive a second pair of signals including the second sense signal and the second amplified signal, generate a second offset measurement based on the second pair of signals, wherein the second offset measurement is representative of a degree of pattern similarity between the second sense signal and the second amplified signal, compare the second offset measurement to a second threshold range defined by a third threshold and a fourth threshold, and detect a second fault on a condition that the second offset measurement is outside of the second threshold range.

24. The capacitive sensor of claim 19, where the diagnostic circuit is further configured to receive a second pair of signals including the first sense signal and the second sense signal, generate a second offset measurement based on the second pair of signals, wherein the second offset measurement is representative of a degree of pattern similarity between the first sense signal and the second sense signal, compare the second offset measurement to a second threshold range defined by a third threshold and a fourth threshold, and detect a second fault on a condition that the second offset measurement is outside of the second threshold range.

25. A capacitive sensor, comprising:
a first conductive structure;
a second conductive structure that is counter to the first conductive structure, wherein the second conductive structure is movable relative to the first conductive structure in response to an external force acting thereon, wherein the second conductive structure is capacitively coupled to the first conductive structure to form a first capacitor having a first capacitance that changes with a change in a distance between the first conductive structure and second conductive structure, wherein the first capacitance is representative of the external force and the first capacitor comprises a first micro-electromechanical system (MEMS) output configured to output a first sense signal representative of the first capacitance;
an amplifier comprising a first amplifier input coupled to the first MEMS output for receiving the first sense signal and configured to output a first amplified signal and a second amplified signal based on the first sense signal, wherein the first amplified signal is in phase with the first sense signal and the second amplified signal is 180° out of phase with the first sense signal; and
a diagnostic circuit configured to:
receive a first pair of signals including the first sense signal and the first amplified signal, generate a first offset measurement based on the first pair of signals, wherein the first offset measurement is representative of a degree of pattern similarity between the first sense signal and the first amplified signal, compare the first offset measurement to a first threshold range defined by a first threshold and a second threshold, and detect a first fault on a condition that the first offset measurement is outside of the first threshold range, or
receive a second pair of signals including the first sense signal and the second amplified signal, generate a second offset measurement based on the second pair of signals, wherein the second offset measurement is representative of a degree of pattern similarity between the first sense signal and the second amplified signal, compare the second offset measurement to a second threshold range defined by a third threshold and a fourth threshold, and detect a second fault on a condition that the second offset measurement is outside of the second threshold range,
wherein the diagnostic circuit comprises:
a comparator circuit configured to compare the first offset measurement to the first threshold range and activate a first fault signal on the condition that the first offset measurement is outside of the first threshold range; and
an error processing circuit configured to receive the first fault signal and generate a second fault signal in response to the first fault signal being activated, uninterrupted, for a predetermined time interval, wherein the second fault signal is indicative of a confirmation of the first fault.

26. The capacitive sensor of claim 25, wherein the diagnostic circuit is configured to:
  receive a first pair of signals including the first sense signal and the first amplified signal, generate a first offset measurement based on the first pair of signals, wherein the first offset measurement is representative of a degree of pattern similarity between the first sense signal and the first amplified signal, compare the first offset measurement to a first threshold range defined by a first threshold and a second threshold, and detect a first fault on a condition that the first offset measurement is outside of the first threshold range, and
  receive a second pair of signals including the first sense signal and the second amplified signal, generate a second offset measurement based on the second pair of signals, wherein the second offset measurement is representative of a degree of pattern similarity between the first sense signal and the second amplified signal, compare the second offset measurement to a second threshold range defined by a third threshold and a fourth threshold, and detect a second fault on a condition that the second offset measurement is outside of the second threshold range.

27. The capacitive sensor of claim 26, wherein the diagnostic circuit comprises:
  a difference circuit configured to generate the first offset measurement as a difference between the first sense signal and the first amplified signal; and
  an averaging circuit configured to generate the second offset measurement as an average of the first sense signal and the second amplified signal.

28. The capacitive sensor of claim 26, wherein the diagnostic circuit comprises:
  at least one phase shifter configured to align a phase of the first sense signal with a phase of the second amplified signal;
  a first difference circuit configured to generate the first offset measurement as a difference between the first sense signal and the first amplified signal; and
  a second difference circuit arranged downstream from the at least one phase shifter and configured to generate the second offset measurement as a difference between the first sense signal and the second amplified signal.

29. A capacitive sensor, comprising:
  a first conductive structure;
  a second conductive structure that is counter to the first conductive structure, wherein the second conductive structure is movable relative to the first conductive structure in response to an external force acting thereon, wherein the second conductive structure is capacitively coupled to the first conductive structure to form a first capacitor having a first capacitance that changes with a change in a distance between the first conductive structure and second conductive structure, wherein the first capacitance is representative of the external force and the first capacitor comprises a first micro-electromechanical system (MEMS) output configured to output a first sense signal representative of the first capacitance;
  a third conductive structure that is counter to the first conductive structure, wherein the third conductive structure is movable relative to the first conductive structure, wherein the third conductive structure is capacitively coupled to the first conductive structure to form a second capacitor having a second capacitance that changes with a change in a distance between the first conductive structure and third conductive structure, wherein the second capacitance is representative of the external force and the second capacitor comprises a second MEMS output configured to output a second sense signal representative of the second capacitance;
  an amplifier comprising a first amplifier input coupled to the first MEMS output for receiving the first sense signal and configured to output a first amplified signal based on the first sense signal and comprising a second amplifier input coupled to the second MEMS output and configured to output a second amplified signal based on the second sense signal; and
  a diagnostic circuit configured to receive a first pair of signals including the first sense signal and the first amplified signal, generate a first offset measurement based on the first pair of signals, wherein the first offset measurement is representative of a degree of pattern similarity between the first sense signal and the first amplified signal, compare the first offset measurement to a first threshold range defined by a first threshold and a second threshold, and detect a first fault on a condition that the first offset measurement is outside of the first threshold range,
    wherein the diagnostic circuit comprises:
      a comparator circuit configured to compare the first offset measurement to the first threshold range and activate a first fault signal on the condition that the first offset measurement is outside of the first threshold range; and
      an error processing circuit configured to receive the first fault signal and generate a second fault signal in response to the first fault signal being activated, uninterrupted, for a predetermined time interval, wherein the second fault signal is indicative of a confirmation of the first fault.

30. The capacitive sensor of claim 29, wherein the diagnostic circuit is further configured to receive a second pair of signals including the second sense signal and the second amplified signal, generate a second offset measurement based on the second pair of signals, wherein the second offset measurement is representative of a degree of pattern similarity between the second sense signal and the second amplified signal, compare the second offset measurement to a second threshold range defined by a third threshold and a fourth threshold, and detect a second fault on a condition that the second offset measurement is outside of the second threshold range.

* * * * *

UNITED STATES PATENT AND TRADEMARK OFFICE
CERTIFICATE OF CORRECTION

PATENT NO. : 12,467,816 B2
APPLICATION NO. : 17/741718
DATED : November 11, 2025
INVENTOR(S) : Constantin Crisu et al.

It is certified that error appears in the above-identified patent and that said Letters Patent is hereby corrected as shown below:

In the Claims

Claim 5:
Column 24, Line 43-45 change "tic circuit comprises a first DC shifter configured to shift a first DC component to a mid-supply value and a second direct current (DC) shifter configured to shift a second DC" to --tic circuit comprises a first direct current (DC) shifter configured to shift a first DC component to a mid-supply value and a second DC shifter configured to shift a second DC--

Claim 12:
Column 25, Lines 39-42 change "the first offset measurement is a difference between the first DC component of the first measurement signal and the second DC component of the second measurement signal." to --the first offset measurement is a difference between the first DC component and the second DC component.--

Claim 14:
Column 25, Lines 58-59 change "the first offset measurement is an average of the first DC component and the second DC component." to --the first offset measurement is an average of the first DC component of the first measurement signal and the second DC component of the second measurement signal.--

Claim 19:
Column 26, Lines 57 change "micro-electromechanical (MEMS) output configured to" to --micro-electromechanical system (MEMS) output configured to--

Signed and Sealed this
Thirtieth Day of December, 2025

John A. Squires
*Director of the United States Patent and Trademark Office*